United States Patent
Yamazaki et al.

(10) Patent No.: US 10,466,560 B2
(45) Date of Patent: Nov. 5, 2019

(54) DISPLAY DEVICE

(71) Applicant: Semiconductor Energy Laboratory Co., Ltd., Atsugi-shi, Kanagawa-ken (JP)

(72) Inventors: Shunpei Yamazaki, Tokyo (JP); Kensuke Yoshizumi, Kanagawa (JP); Hideaki Shishido, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 165 days.

(21) Appl. No.: 15/816,277

(22) Filed: Nov. 17, 2017

(65) Prior Publication Data
US 2018/0143473 A1    May 24, 2018

(30) Foreign Application Priority Data

Nov. 22, 2016 (JP) ................. 2016-226669

(51) Int. Cl.
*G02F 1/1368* (2006.01)
*G02F 1/1335* (2006.01)
*G02F 1/1362* (2006.01)

(52) U.S. Cl.
CPC ...... *G02F 1/1368* (2013.01); *G02F 1/133512* (2013.01); *G02F 1/133514* (2013.01); *G02F 1/136227* (2013.01); *G02F 1/136286* (2013.01); *G02F 2201/123* (2013.01); *G02F 2201/40* (2013.01); *G02F 2201/44* (2013.01)

(58) Field of Classification Search
CPC ............ G02F 1/1368; G02F 1/133512; G02F 1/133514; G02F 1/136227; G02F 1/136286; G02F 2001/134345; G02F 2201/123; G02F 2201/40; G02F 2201/44
USPC ........................................... 349/43
See application file for complete search history.

(56) References Cited

U.S. PATENT DOCUMENTS

| | | |
|---|---|---|
| 5,929,961 A | 7/1999 | Nishi et al. |
| 6,781,152 B2 | 8/2004 | Yamazaki |
| 6,784,457 B2 | 8/2004 | Yamazaki et al. |
| 6,825,488 B2 | 11/2004 | Yamazaki et al. |
| 7,023,021 B2 | 4/2006 | Yamazaki et al. |
| 7,491,477 B2 | 2/2009 | Fukai et al. |
| 7,612,849 B2 | 11/2009 | Eguchi et al. |

(Continued)

FOREIGN PATENT DOCUMENTS

| | | |
|---|---|---|
| JP | 2007-096055 | 4/2007 |
| JP | 2007-123861 | 5/2007 |

*Primary Examiner* — Edward J Glick
*Assistant Examiner* — William D Peterson
(74) *Attorney, Agent, or Firm* — Fish & Richardson P.C.

(57) ABSTRACT

A display device whose power consumption can be reduced is provided. Alternatively, the aperture ratio of a display device is increased. The display device includes a pixel having a first subpixel and a second subpixel. The first subpixel includes a first coloring layer and a first transistor, and the second subpixel includes a second coloring layer and a second transistor. At least regions where channels might be formed in semiconductor layers of the first and second transistors are positioned to overlap with the first coloring layer. The first coloring layer is likely to absorb light with a shorter wavelength than light absorbed by the second coloring layer. The semiconductor layers, electrodes, wirings, and the like included in the transistors transmit visible light.

26 Claims, 23 Drawing Sheets

(56) References Cited

U.S. PATENT DOCUMENTS

| | | |
|---|---|---|
| 7,674,650 B2 | 3/2010 | Akimoto et al. |
| 7,773,182 B2 | 8/2010 | Kimura et al. |
| 7,804,552 B2 | 9/2010 | Yamazaki et al. |
| 8,441,425 B2 | 5/2013 | Ishitani et al. |
| 8,773,622 B2 | 7/2014 | Kurokawa et al. |
| 8,884,509 B2 | 11/2014 | Matsukura |
| 8,941,617 B2 | 1/2015 | Koyama et al. |
| 9,053,675 B2 | 6/2015 | Miyake et al. |
| 9,245,907 B2 | 1/2016 | Nakada et al. |
| 9,316,857 B2 | 4/2016 | Yamazaki et al. |
| 9,349,325 B2 | 5/2016 | Yamazaki et al. |
| 9,417,475 B2 | 8/2016 | Fukutome et al. |
| 9,553,114 B2 | 1/2017 | Nakada et al. |
| 9,697,788 B2 | 7/2017 | Yamazaki et al. |
| 9,710,013 B2 | 7/2017 | Hirakata et al. |
| 2004/0263066 A1 | 12/2004 | Abe et al. |
| 2007/0002199 A1 | 1/2007 | Fujikawa et al. |
| 2015/0301422 A1 | 10/2015 | Miyake et al. |
| 2015/0362776 A1 | 12/2015 | Jikumaru et al. |
| 2016/0042696 A1 | 2/2016 | Hirakata et al. |
| 2016/0042702 A1 | 2/2016 | Hirakata et al. |
| 2016/0274699 A1 | 9/2016 | Shishido et al. |
| 2016/0282989 A1 | 9/2016 | Hirakata et al. |
| 2017/0104049 A1 | 4/2017 | Nakamura et al. |
| 2018/0188596 A1* | 7/2018 | Lo ................... G02F 1/133514 |

* cited by examiner

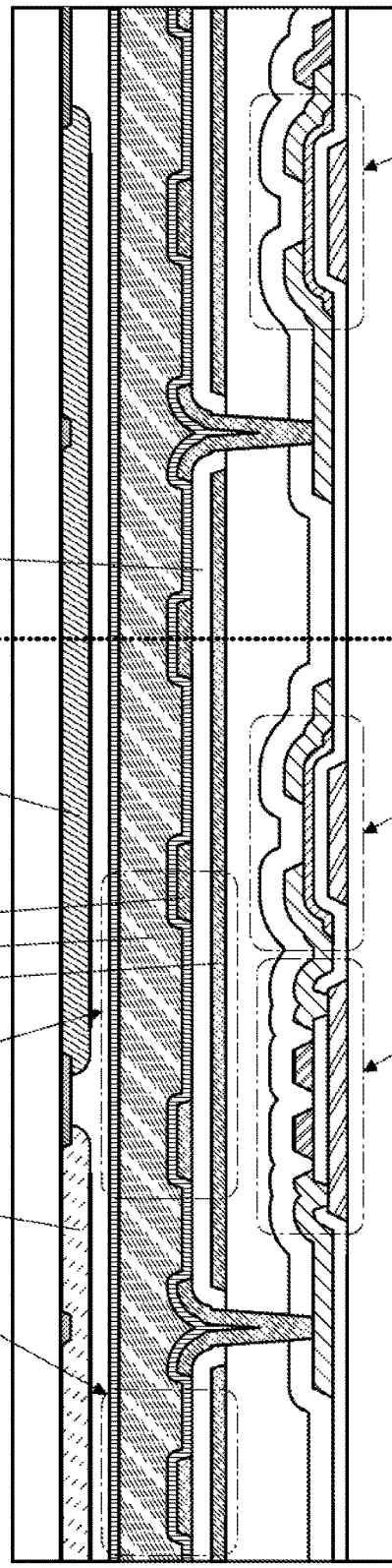
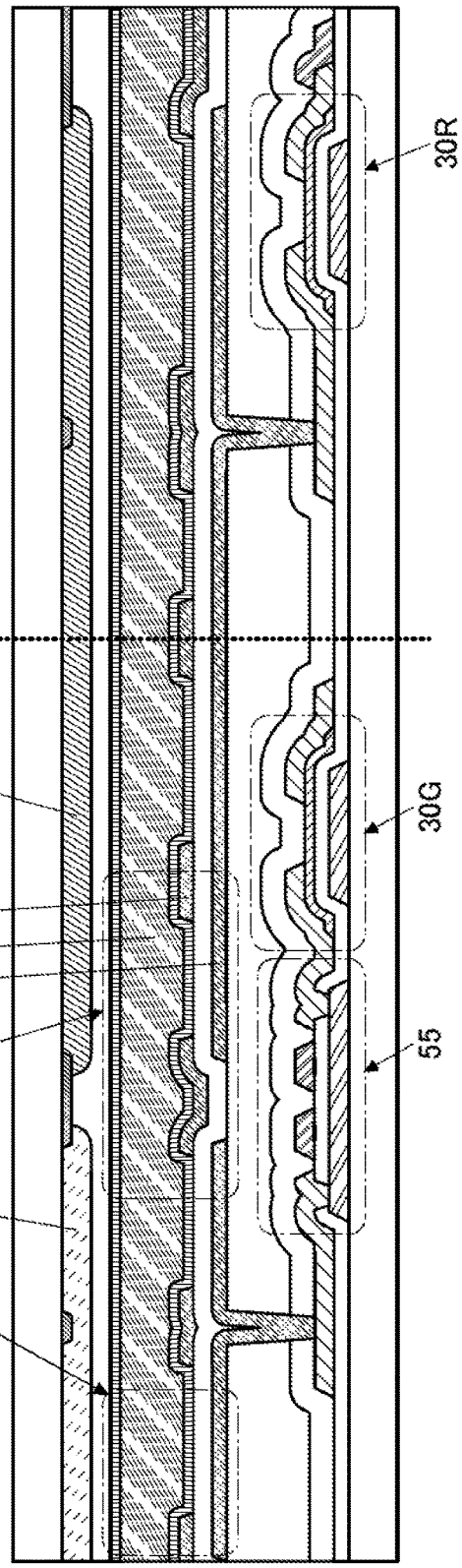

DISPLAY DEVICE

BACKGROUND OF THE INVENTION

1. Field of the Invention

One embodiment of the present invention relates to a display device.

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof.

In this specification and the like, a semiconductor device generally means a device that can function by utilizing semiconductor characteristics. A transistor, a semiconductor circuit, an arithmetic device, a memory device, and the like are each an embodiment of the semiconductor device. In addition, an imaging device, an electro-optical device, a power generation device (e.g., a thin film solar cell or an organic thin film solar cell), and an electronic device each may include a semiconductor device.

2. Description of the Related Art

Electronic devices that consume low power are required. Since portable electronic devices such as smartphones and tablet terminals, in particular, include batteries as their power sources, high power consumption results in a short available time between charges.

A liquid crystal display device is known as a display device included in an electronic device. A transmissive liquid crystal display device adjusts the amount of light from a backlight to be transmitted and shows contrast by utilizing optical modulation action of a liquid crystal to display an image.

An active matrix liquid crystal display device in which transistors whose channel formation regions are formed using a metal oxide are included as switching elements connected to respective pixel electrodes is known, for example (Patent Documents 1 and 2).

REFERENCE

Patent Documents

[Patent Document 1] Japanese Published Patent Application No. 2007-123861
[Patent Document 2] Japanese Published Patent Application No. 2007-096055

SUMMARY OF THE INVENTION

To reduce the power consumption of a liquid crystal display device (liquid crystal panel), light from a backlight is extracted efficiently, for example.

An object of one embodiment of the present invention is to provide a display device whose power consumption can be reduced. Another object of one embodiment of the present invention is to increase the aperture ratio of a display device. Another object of one embodiment of the present invention is to provide a display device having a high aperture ratio and high reliability. Another object of one embodiment of the present invention is to provide a novel display device.

Note that the description of these objects does not preclude the existence of other objects. In one embodiment of the present invention, there is no need to achieve all the objects. Other objects can be derived from the description of the specification, the drawings, the claims, and the like.

One embodiment of the present invention is a display device including a first coloring layer, a second coloring layer, a first transistor, a second transistor, a first display element, and a second display element. The first display element is electrically connected to the first transistor and overlaps with the first coloring layer. The second display element is electrically connected to the second transistor and overlaps with the second coloring layer. The first transistor includes a first semiconductor layer. The second transistor includes a second semiconductor layer. The first semiconductor layer and the second semiconductor layer each have a region overlapping with the first coloring layer.

Another embodiment of the present invention is a display device including a first coloring layer, a second coloring layer, a third coloring layer, a first transistor, a second transistor, a third transistor, a first display element, a second display element, and a third display element. The first display element is electrically connected to the first transistor and overlaps with the first coloring layer. The second display element is electrically connected to the second transistor and overlaps with the second coloring layer. The third display element is electrically connected to the third transistor and overlaps with the third coloring layer. The first transistor includes a first semiconductor layer. The second transistor includes a second semiconductor layer. The third transistor includes a third semiconductor layer. The first semiconductor layer, the second semiconductor layer, and the third semiconductor layer each have a region overlapping with the first coloring layer.

In the above structure, the first coloring layer preferably transmits longer wavelength light than the second coloring layer. Alternatively, the first coloring layer preferably transmits red light.

In the above structure, a light source emitting white light is preferably included. In that case, the first coloring layer is preferably between the light source and each of the first semiconductor layer and the second semiconductor layer.

In the above structure, the first transistor preferably includes a first gate electrode and first and second electrodes connected to the first semiconductor layer. The second transistor preferably includes a second gate electrode and third and fourth electrodes connected to the second semiconductor layer. In that case, each of the first electrode, the second electrode, the third electrode, and the fourth electrode preferably has a region transmitting visible light and overlapping with the first coloring layer. It is preferable that each of the first gate electrode and the second gate electrode also have a region transmitting visible light and overlapping with the first coloring layer. Alternatively, the first gate electrode and the second gate electrode may each be configured to block visible light.

In the above structure, a first wiring and a second wiring are preferably included. In that case, it is preferable that the first electrode be electrically connected to the first wiring, the second electrode be electrically connected to the first display element, the third electrode be electrically connected to the second wiring, and the fourth electrode be electrically connected to the second display element. The fourth electrode preferably intersects with the second wiring. Alternatively, the fourth electrode preferably intersects with the first wiring and with the second wiring. Further alternatively, the fourth electrode preferably does not intersect with the first wiring nor the second wiring.

In the above structure, a first wiring and a second wiring are preferably included. In that case, the first transistor includes a first gate electrode, and the second transistor includes a second gate electrode. Furthermore, the first semiconductor layer has a region overlapping with the first gate electrode and a region connected to the first wiring. Moreover, the second semiconductor layer has a region overlapping with the second gate electrode and a region connected to the second wiring. The second semiconductor layer preferably intersects with the second wiring. Alternatively, the second semiconductor layer preferably intersects with the second wiring and with the first wiring. Further alternatively, the second semiconductor layer preferably does not intersect with the first wiring nor the second wiring.

In the above structure, each of the first semiconductor layer and the second semiconductor layer preferably contains a metal oxide.

In the above structure, the first display element preferably includes a fifth electrode, a sixth electrode, and a liquid crystal. In that case, it is preferable that the fifth electrode be electrically connected to the first transistor, and each of the fifth electrode and the sixth electrode transmit visible light.

One embodiment of the present invention can provide a display device whose power consumption can be reduced. Alternatively, the aperture ratio of a display device can be increased. Alternatively, a display device with a high aperture ratio and high reliability can be provided. Alternatively, a novel display device can be provided.

Note that the description of these effects does not preclude the existence of other effects. One embodiment of the present invention does not necessarily achieve all the effects listed above. Other effects can be derived from the description of the specification, the drawings, the claims, and the like.

BRIEF DESCRIPTION OF THE DRAWINGS

FIGS. 10A and 10B each illustrate a structure example of a display device.

DETAILED DESCRIPTION OF THE INVENTION

Figure 1A:
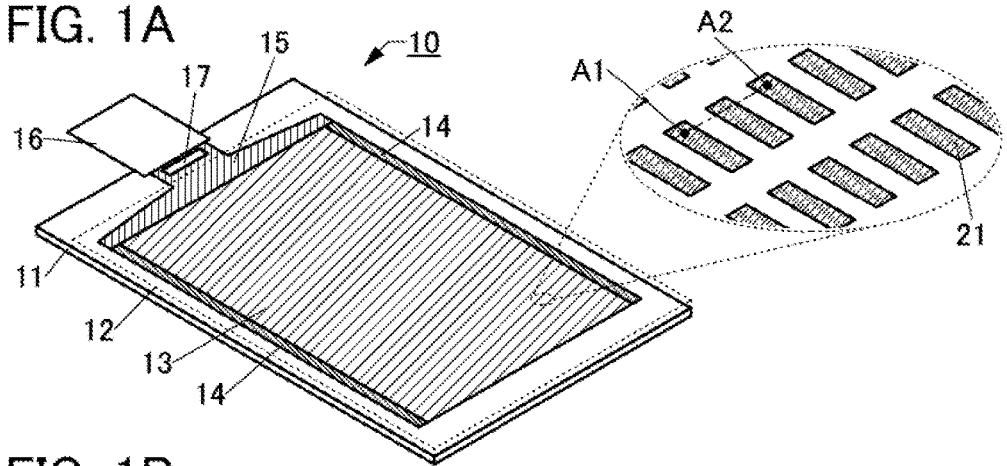
FIGS. 1A to 1C illustrate a structure example of a display device.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments.

Note that in structures of the invention described below, the same portions or portions having similar functions are denoted by the same reference numerals in different drawings, and the description thereof is not repeated. Furthermore, the same hatching pattern is applied to portions having similar functions, and the portions are not denoted by reference numerals in some cases.

Note that in each drawing described in this specification, the size, the layer thickness, or the region of each component is exaggerated for clarity in some cases. Therefore, the size, the layer thickness, or the region is not limited to the illustrated scale.

Note that in this specification and the like, ordinal numbers such as "first," "second," and the like are used in order to avoid confusion among components and do not limit the number.

A transistor is a kind of semiconductor elements and can cause amplification of current or voltage, switching operation for controlling conduction and non-conduction, or the like. A transistor in this specification includes an insulated gate field-effect transistor (IGFET) and a thin film transistor (TFT).

In this specification and the like, a display panel as one embodiment of a display device has a function of displaying (outputting) an image or the like on (to) a display surface; hence, the display panel is one embodiment of an output device.

In this specification and the like, a structure in which a connector such as a flexible printed circuit (FPC) or a tape carrier package (TCP) is attached to a substrate of a display panel, or a structure in which an IC is mounted on a substrate by a chip on glass (COG) method or the like is referred to as a display panel module or a display module, or simply referred to as a display panel or the like in some cases.

In this specification and the like, a touch sensor has a function of sensing the contact, press, approach, or the like of an object such as a finger or a stylus. In addition, the touch sensor may have a function of sensing the positional information of the object. Therefore, the touch sensor is one embodiment of an input device. For example, the touch sensor can include one or more sensor elements.

In this specification and the like, a substrate provided with a touch sensor is referred to as a touch sensor panel or simply referred to as a touch sensor or the like in some cases.

Furthermore, in this specification and the like, a structure in which a connector such as an FPC or a TCP is attached to a substrate of a touch sensor panel, or a structure in which an IC is mounted on a substrate by a COG method or the like is referred to as a touch sensor panel module, a touch sensor module, or a sensor module, or simply referred to as a touch sensor or the like in some cases.

Note that in this specification and the like, a touch panel which is one embodiment of a display device has a function of displaying (outputting) an image or the like on (to) a display surface and a function as a touch sensor capable of sensing contact, press, approach, or the like of an object such as a finger or a stylus on or to the display surface. Therefore, the touch panel is one embodiment of an input/output device.

A touch panel can be referred to, for example, a display panel (or a display device) with a touch sensor or a display panel (or a display device) having a touch sensor function.

A touch panel can include a display panel and a touch sensor panel. Alternatively, a touch panel can have a function of a touch sensor inside a display panel or on a surface of the display panel.

In this specification and the like, a structure in which a connector such as an FPC or a TCP is attached to a substrate of a touch panel, or a structure in which an IC is mounted on a substrate by a COG method or the like is referred to as a touch panel module or a display module, or simply referred to as a touch panel or the like in some cases.

Embodiment 1

In this embodiment, a display device of one embodiment of the present invention will be described.

One embodiment of the present invention is a display device including a plurality of transmissive liquid crystal elements and transistors electrically connected to the liquid crystal elements.

The liquid crystal elements each include a pair of electrodes and a liquid crystal. The electrodes transmit visible light. One of the electrodes functions as a pixel electrode and is electrically connected to the corresponding transistor. The other of the electrodes functions as a common electrode to which a potential that is also supplied to another pixel is supplied.

In a display region of the display device, a plurality of pixels are arranged in a matrix. Each of the pixels includes two or more subpixels. Each subpixel includes one pixel electrode, a transistor functioning as a selection transistor, and a coloring layer.

For example, each pixel includes a first subpixel and a second subpixel. The first subpixel includes a first coloring layer and a first transistor, and the second subpixel includes a second coloring layer and a second transistor. In that case, the first and second transistors are positioned to overlap with the first coloring layer. Specifically, at least regions where channels might be formed in semiconductor layers of the first and second transistors are positioned to overlap with the first coloring layer.

Accordingly, the first transistor and the second transistor are irradiated with light that has passed the first coloring layer. For this reason, it is possible for the first transistor and the second transistor to be affected by light irradiation to substantially the same degree. Thus, contrast variation between adjacent subpixels can be prevented.

It is preferable that the first coloring layer be likely to absorb light with a shorter wavelength than light absorbed by the second coloring layer. It is particularly preferable that the first coloring layer transmit light with a longer wavelength than light the second coloring layer transmits and absorb other visible light. Accordingly, light obtained by removing light with a short wavelength from incident light enters the first and second transistors through the first coloring layer, leading to a reduction in the influence of light on the transistors. Alternatively, light that has passed the first coloring layer can be light that does not affect the transistors. Accordingly, an extremely highly reliable display device can be fabricated.

In the case where a backlight is provided, the backlight is preferably provided so that the first coloring layer is positioned between the backlight and each of the first and second transistors. Accordingly, the influence of light emitted from the backlight to the first and second transistors can be reduced.

Alternatively, the first coloring layer may be provided on the opposite side of the transistors from the backlight (i.e., on the display surface side). In that case, an influence on the transistors due to external light that enters the display device from the display surface side can be reduced.

The semiconductor layers of the first and second transistors where the channels are formed are preferably formed using a metal oxide exhibiting semiconductor characteristics (also referred to as an oxide semiconductor, OS). Furthermore, each of the semiconductor layers preferably includes a pair of low-resistance regions between which the channel formation region is sandwiched. The low-resistance regions have higher conductivity than the channel formation region and can also be referred to as oxide conductors (OCs). A region where the semiconductor layer is provided can be used as a region transmitting visible light (also referred to as a transmissive region), which enables the aperture ratio of the display device to be increased.

It is also preferable that electrodes, wirings, and the like included in the first and second transistors be formed using materials that transmit visible light. It is particularly preferable to use a metal oxide. For example, gate electrodes, source electrodes, and drain electrodes of the first and second transistors can be formed using light-transmitting conductive materials. Accordingly, the aperture ratio of the display device can be further increased.

Since the low-resistance regions of the semiconductor layers, the source electrodes, and the drain electrodes each have a light-transmitting property, contact portions thereof can also be transmissive regions; thus, the aperture ratio can be further be increased.

As mentioned above, the channel formation regions of the semiconductor layers are positioned to overlap with the first coloring layer; accordingly, an influence on the transistors can be inhibited even when the gate electrodes have a light-transmitting property and the channel formation regions are irradiated with light through the first coloring layer.

In the first subpixel, for example, the pixel electrode can have a region overlapping with the semiconductor layer, gate electrode, source electrode, drain electrode, and the like having a light-transmitting property.

Each of the subpixels may include a capacitor functioning as a storage capacitor. In that case, it is preferable to use a light-transmitting conductive material for a pair of electrodes included in the capacitor and a wiring or the like electrically connected to the capacitor. The capacitor is less likely to be affected by light and thus can be provided to overlap with the coloring layer included in the corresponding subpixel.

Note that a light-transmitting material can be used for the source and drain electrodes, and a light-blocking material can be used for the gate electrodes. In that case, the gate electrodes having a light-blocking property are preferably positioned on the display surface side and the first coloring layer is preferably positioned closer to the backlight than to the transistors. Accordingly, the influence of light from the backlight can be inhibited owing to the first coloring layer and the influence of external light entering from the display surface side can be inhibited owing to the gate electrodes having a light-blocking property.

Although a light-transmitting material can be used for wirings for electrically supplying a signal or a potential to the subpixels (also referred to as bus lines), a light-blocking material such as metal is preferably used because wiring resistance can be reduced. Examples of the bus lines include a wiring through which a gate signal is supplied (also referred to as a gate line), a wiring through which a source signal is supplied (also referred to as a source line or a signal line), and a wiring through which a common potential, a power supply potential, or the like is supplied (also referred to as a power line). Note that a region other than the bus lines can be a transmissive region, leading to an extremely high aperture ratio.

Each pixel may include three or more subpixels of different colors. In that case, it is possible to employ a structure in which transistors are provided not in a region overlapping with a coloring layer that transmits light with the shortest wavelength but in a region overlapping with other coloring layers. It is particularly preferable that the transistors included in the subpixels be provided to overlap with a coloring layer that transmits light with the longest wavelength.

In the case where each pixel includes three subpixels for red light, green light, and blue light, for example, transistors included in the subpixels can be provided to overlap with any coloring layer except a coloring layer that transmits blue light, that is, a coloring layer that transmits red or green light. It is particularly preferable that three transistors be provided to overlap with the coloring layer that transmits red light.

A more specific example will be described below with reference to drawings.

Structure Example 1

FIG. 1A is a schematic perspective view of a display device 10. The display device 10 includes a substrate 11 and a substrate 12 which are bonded to each other. In FIG. 1A, the substrate 12 is denoted by a dashed line. The schematic perspective view in FIG. 1A illustrates the display device 10 seen from the opposite side of a display surface side. This means that the display surface of the display device 10 is on the substrate 11 side.

The display device 10 includes a display portion 13, a circuit 14, a wiring 15, and the like. The circuit 14, the wiring 15, and a conductive layer 21 functioning as a pixel electrode, which is included in the display portion 13, are provided on the substrate 11, for example. FIG. 1A illustrates an example in which an IC 17 and an FPC 16 are mounted on the substrate 11. Thus, the structure illustrated in FIG. 1A can be referred to as a display module.

A circuit functioning as a scan line driver circuit can be used as the circuit 14, for example.

The wiring 15 has a function of supplying a signal or power to the display portion 13 and the circuit 14. The signal or power is supplied to the wiring 15 from the outside via the FPC 16, or from the IC 17.

In FIG. 1A, the IC 17 is mounted on the substrate 11 by a chip on glass (COG) method as an example. As the IC 17, for example, an IC serving as a signal line driver circuit can be used. Note that the IC 17 is not necessarily provided. Alternatively, the IC 17 may be mounted on the FPC 16 by a chip on film (COF) method.

FIG. 1A is an enlarged view of part of the display portion 13. The conductive layers 21 included in a plurality of display elements are arranged in a matrix in the display portion 13. The conductive layers 21 function as pixel electrodes, for example.

Cross-Sectional Structure Example

Figure 1B:
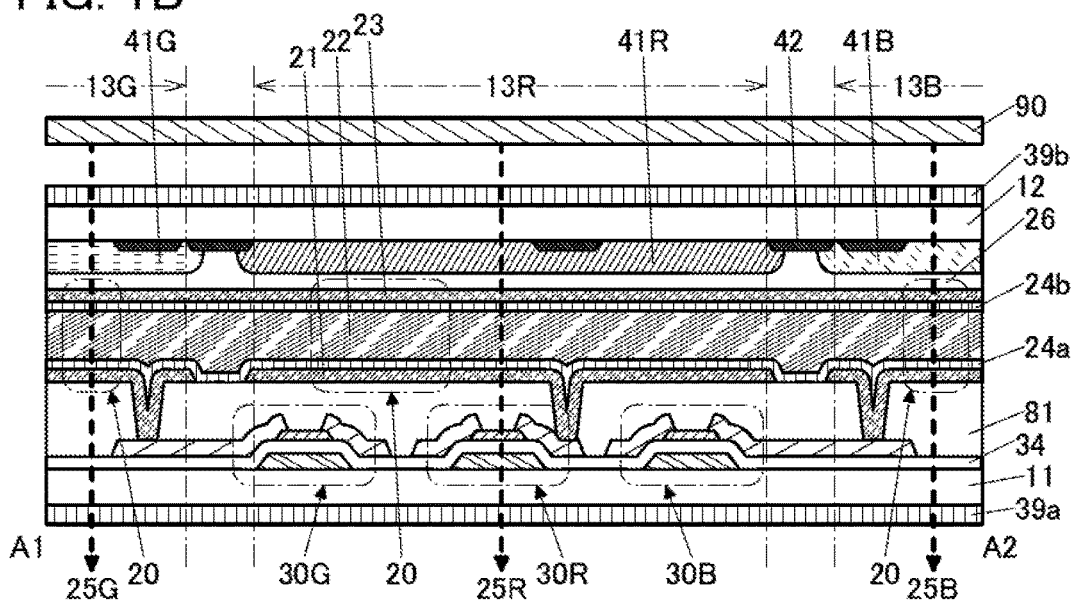

FIG. 1B illustrates an example of a cross section along a line A1-A2 in FIG. 1A. A cross section of a region including adjacent three pixels (subpixels) is illustrated in FIG. 1B. Here, an example where a transmissive liquid crystal element 20 is used as a display element is shown. In FIG. 1B, the substrate 11 side is the display surface side.

In the display device 10, a liquid crystal 22 is provided between the substrate 11 and the substrate 12. The liquid crystal element 20 includes the conductive layer 21 provided on the substrate 11 side, a conductive layer 23 provided on the substrate 12 side, and the liquid crystal 22 provided between the conductive layers 21 and 23. Furthermore, an alignment film 24a is provided between the liquid crystal 22 and the conductive layer 21 and an alignment film 24b is provided between the liquid crystal 22 and the conductive layer 23.

The conductive layer 21 functions as a pixel electrode. The conductive layer 23 functions as a common electrode or the like. The conductive layer 21 and the conductive layer 23 each have a function of transmitting visible light. Thus, the liquid crystal element 20 is a transmissive liquid crystal element.

FIG. 1B illustrates three liquid crystal elements 20. Each of the liquid crystal elements 20 overlaps with a coloring layer 41R, a coloring layer 41G, or a coloring layer 41B. A light-blocking layer 42 is provided between two coloring layers. An insulating layer 26 is provided to cover the coloring layers and the light-blocking layers 42, and the conductive layer 23 is provided to cover the insulating layer 26. The light-blocking layers 42 preferably overlap with contact portions of the conductive layer 21 and a transistor 30R and the like.

The coloring layer 41R transmits red light and absorbs other visible light, the coloring layer 41G transmits green light and absorbs other visible light, and the coloring layer 41B transmits blue light and absorbs other visible light, for example. Each of light 25R that has passed the coloring layer 41R, light 25G that has passed the coloring layer 41G, and light 25B that has passed the coloring layer 41B can have two or more peaks in a visible light region, but preferably has a single peak in a visible light region. Note that the coloring layer 41R transmits light with the longest wavelength among the three coloring layers, and can absorb other light.

The color of light that passes the coloring layer 41R, the coloring layer 41G, or the coloring layer 41B is not limited to the above.

FIG. 1B illustrates a region where the coloring layer 41R is provided as a display region 13R, a region where the coloring layer 41G is provided as a display region 13G, and a region where the coloring layer 41B is provided as a display region 13B. It is preferable that a light-blocking region where the light-blocking layer 42 is positioned be provided between display regions of different colors.

A polarizing plate 39a is located outward from the substrate 11, and a polarizing plate 39b is located outward from the substrate 12. Furthermore, a backlight unit 90 is located outward from the polarizing plate 39b. The display surface of the display device 10 illustrated in FIG. 1B is on the substrate 11 side.

The transistor 30R, a transistor 30G, and a transistor 30B are provided over the substrate 11. Each of the transistors functions as, for example, a selection transistor of a subpixel. The transistor 30R is electrically connected to the conductive layer 21 that overlaps with the coloring layer 41R. The transistor 30G is electrically connected to the conductive layer 21 that overlaps with the coloring layer 41G. The transistor 30B is electrically connected to the conductive layer 21 that overlaps with the coloring layer 41B.

Figure 1C:
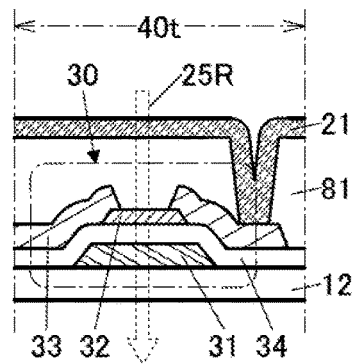

FIG. 1C is an enlarged view of a transistor 30 that is applicable to the transistor 30R, the transistor 30G, or the transistor 30B. The transistor 30 illustrated in FIG. 1C is what is called a channel-etched bottom-gate transistor. The transistor 30 includes a conductive layer 31 functioning as a gate electrode, an insulating layer 34 functioning as a gate insulating layer, a semiconductor layer 32, and a pair of conductive layers 33 functioning as a source electrode and a drain electrode. A region of the semiconductor layer 32 overlapping with the conductive layer 31 functions as a channel formation region. The semiconductor layer 32 is in contact with the conductive layers 33.

The conductive layer 21 functioning as a pixel electrode is provided over an insulating layer 81 and is electrically connected to the conductive layer 33 through an opening provided in the insulating layer 81. The insulating layer 81 preferably functions as a planarization layer.

Each of the conductive layer 31, the semiconductor layer 32, the conductive layers 33, and the insulating layer 34 preferably transmits visible light. Accordingly, the light 25R can pass the transistor 30 as illustrated in FIGS. 1B and 1C. The transistor 30, the liquid crystal element 20, and the coloring layer 41R overlap with one another, in which case a region where the transistor 30 is provided can function as a transmissive region 40t and can be used as part of a display region. Thus, a display device whose aperture ratio (i.e., the proportion of the area of the transmissive region per unit area of the display region) is high can be fabricated.

When a plurality of transistors included in a pixel are provided to overlap with one coloring layer 41R as illustrated in FIG. 1B, the transistors are each irradiated with the light 25R with the same wavelength and the same intensity. Accordingly, even when the electric characteristics or the like of the transistors are affected by the irradiation of the light 25R, the degree of the effects can be substantially at the same level. Thus, a contrast difference between subpixels can be prevented.

The light 25R that has passed the coloring layer 41R has a wavelength longer (or has lower energy) than other light and does not include a wavelength shorter than that of red light; thus, the light 25R is the least likely to be absorbed by the semiconductor layers 32 and the like. Accordingly, even when the light 25R passes the semiconductor layers 32 of the transistors, the display device can have high reliability.

Figure 2:
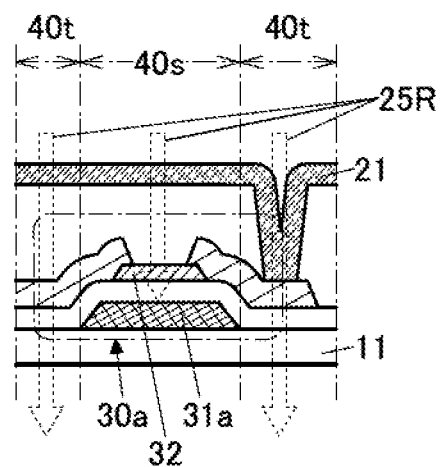
FIG. 2 illustrates a structure example of a display device.

As in a transistor 30a illustrated in FIG. 2, a conductive layer 31a that blocks visible light can be used for a conductive layer functioning as the gate electrode. When light from the display surface side of the semiconductor layer 32 is blocked, external light or the like entering from the display surface side can be prevented from reaching the semiconductor layer 32; thus, the display device can have higher reliability. Meanwhile, the structure illustrated in FIG. 1C is favorable for a high aperture ratio because a region where the conductive layer 31a is provided functions as a light-blocking region 40s.

The above is the description of Structure example 1.

Structure Example 2

Hereinafter, a more specific example of the display device will be described.

Structure Example 2-1 of Pixel

Figure 3A:
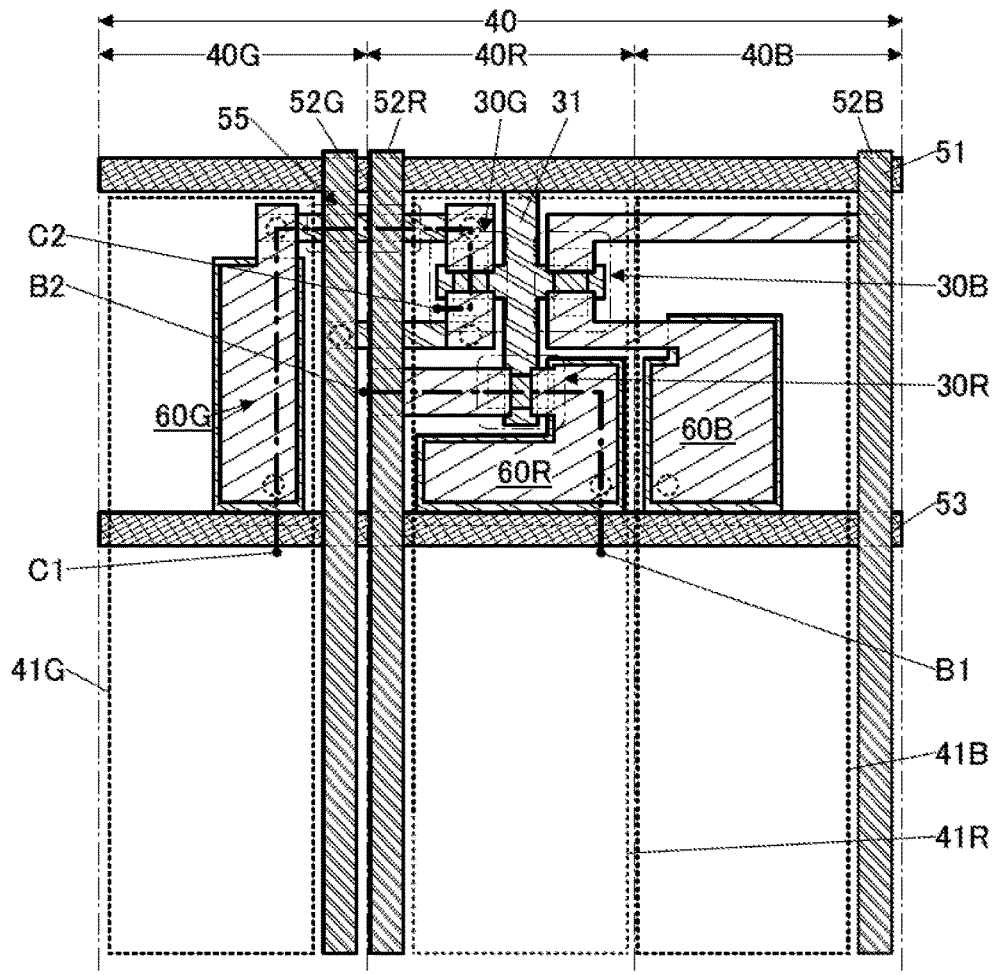
FIGS. 3A and 3B illustrate a structure example of a display device.

FIG. 3A is a schematic top view of one pixel 40 when seen from the opposite side of the display surface side (i.e., the backlight unit 90 side). The pixel 40 includes a subpixel 40G, a subpixel 40R, and a subpixel 40B. The pixel 40 is connected to a wiring 51 functioning as a gate line; a wiring 52G, a wiring 52R, and a wiring 52B each of which functions as a source line; and a wiring 53 functioning as a power line.

The subpixel 40G, the subpixel 40R, and the subpixel 40B include the coloring layer 41G, the coloring layer 41R, and the coloring layer 41B, respectively. Here, the coloring layers are shown by dashed lines. In FIG. 3A, some components (e.g., the conductive layer 21) are not illustrated.

In the subpixel 40R, the transistors 30G, 30R, and 30B and a capacitor 60R are provided in a region overlapping with the coloring layer 41R. It is preferable that conductive layers and semiconductor layers included in the transistors and the capacitor 60R be formed using materials that transmit visible light.

FIG. 3A illustrates an example where the transistors 30G, 30R, and 30B included in the pixel 40 are bottom-gate transistors.

The subpixel 40G and the subpixel 40B include a capacitor 60G and a capacitor 60B, respectively. Each of the capacitors is provided in a region overlapping with the coloring layer 41G or the coloring layer 41B. As with the capacitor 60R included in the subpixel 40R, the capacitors preferably transmit visible light. Note that at least one of the capacitor 60G and the capacitor 60B may be provided in the region of the subpixel 40R overlapping with the coloring layer 41R. The capacitor 60R may be provided in a region overlapping with at least one of the coloring layer 41G and the coloring layer 41B.

Figure 4:
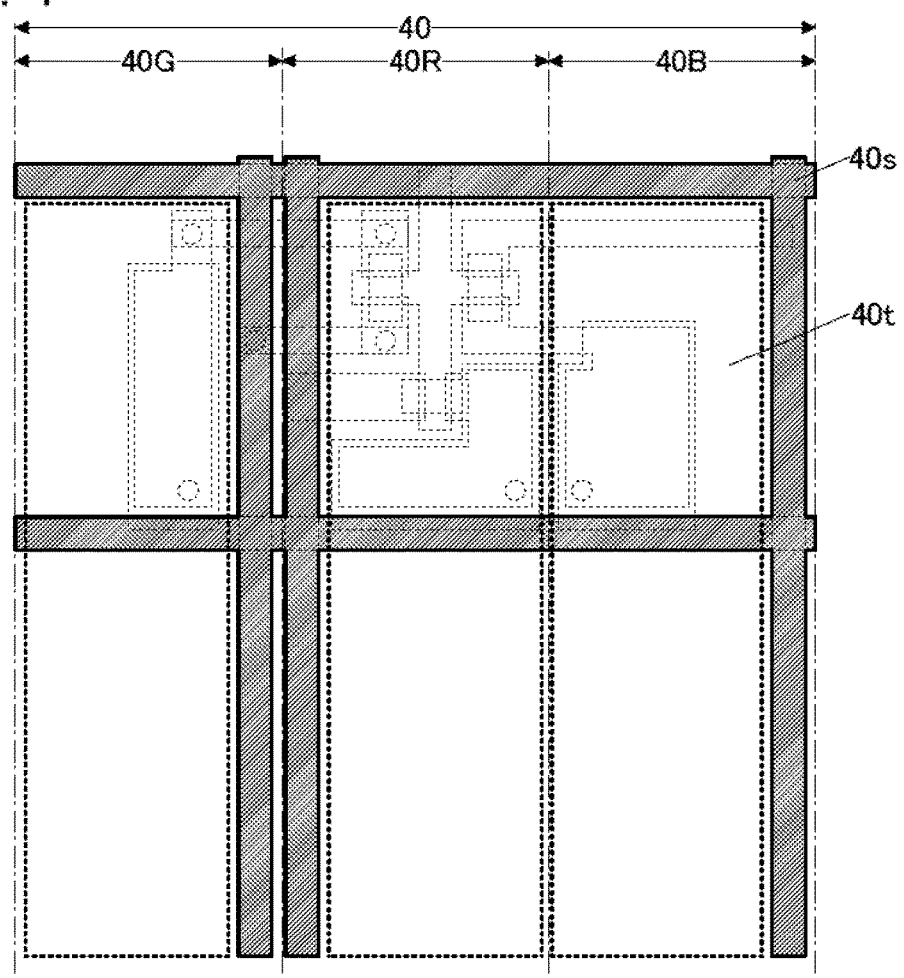
FIG. 4 illustrates a structure example of a display device.

In the pixel 40, the wirings 51, 52R, 52G, 52B, and 53 can be formed using materials that block visible light, and the other layers can be formed using materials that transmit visible light. FIG. 4 illustrates an example where the light-blocking region 40s that blocks visible light and the transmissive region 40t that transmits visible light of the pixel 40 are separately shown. As illustrated in FIG. 4, most of the region except the regions where bus lines are provided can be used as the transmissive region 40t; thus, the aperture ratio can be greatly improved as compared with the case of a conventional display device.

Figure 3B:
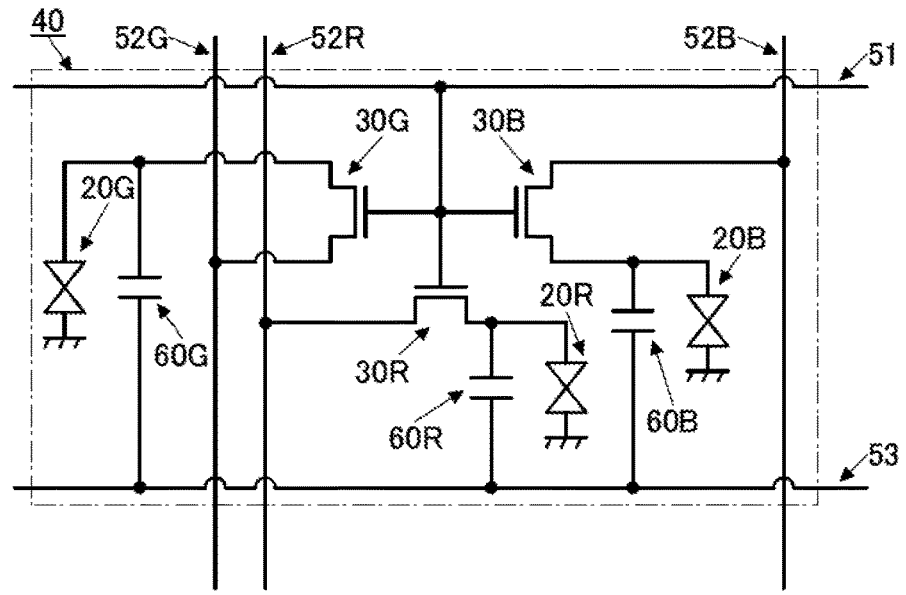

FIG. 3B is a circuit diagram of the pixel 40 illustrated in FIG. 3A. FIG. 3B illustrates a liquid crystal element 20R, a liquid crystal element 20G, and a liquid crystal element 20B in addition to the above components.

In the transistor 30R, a gate is electrically connected to the wiring 51, one of a source and a drain is electrically connected to the wiring 52R, and the other of the source and the drain is electrically connected to one electrode of the capacitor 60R and one electrode (pixel electrode) of the liquid crystal element 20R.

In the transistor 30G, a gate is electrically connected to the wiring 51, one of a source and a drain intersects with the wiring 52R and is electrically connected to the wiring 52G, and the other of the source and the drain intersects with the wirings 52R and 52G and is electrically connected to one electrode of the capacitor 60G and a pixel electrode of the liquid crystal element 20G.

In the transistor 30B, a gate is electrically connected to the wiring 51, one of a source and a drain is electrically connected to the wiring 52B, and the other of the source and the drain is electrically connected to one electrode of the capacitor 60B and a pixel electrode of the liquid crystal element 20B.

The other electrodes of the capacitors 60R, 60G, and 60B are electrically connected to the wiring 53.

Cross-Sectional Structure Example 2-1

Figure 5:
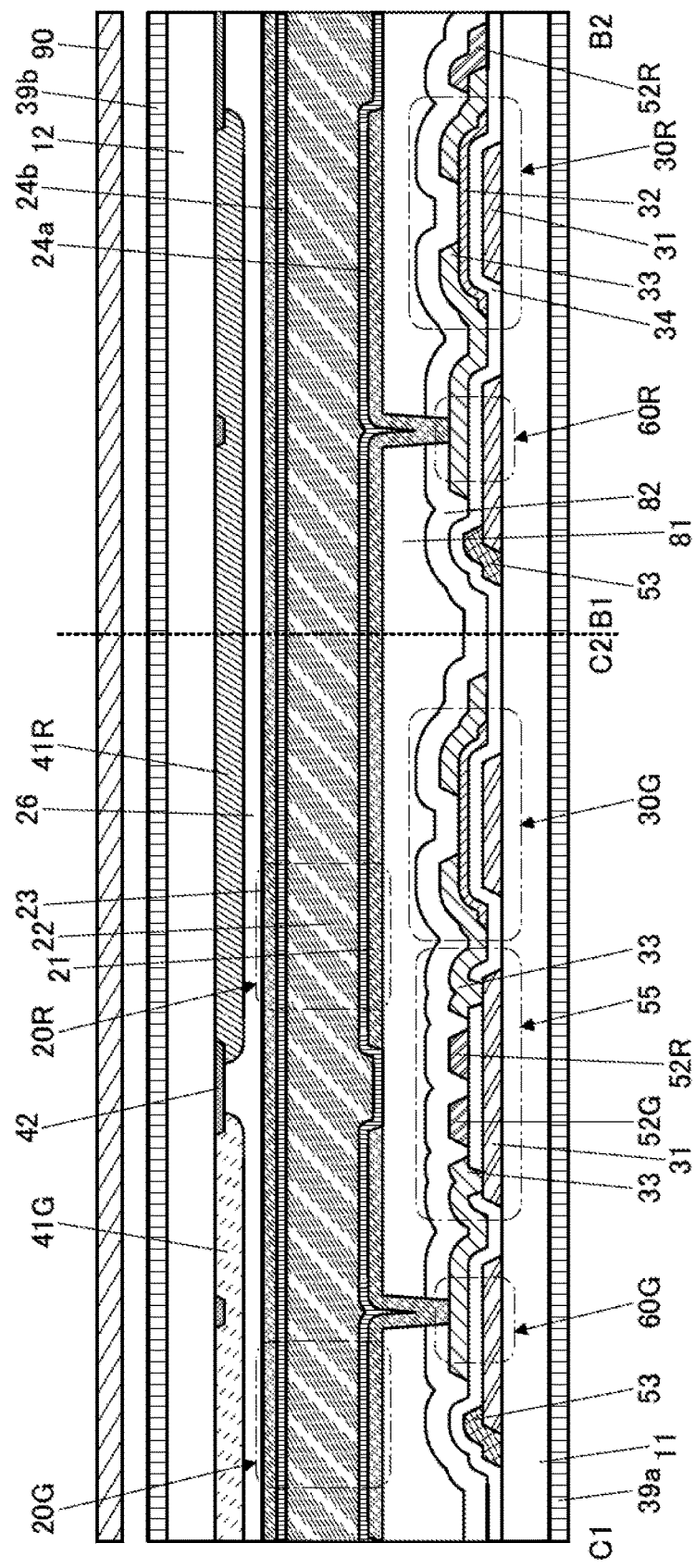
FIG. 5 illustrates a structure example of a display device.

FIG. 5 illustrates cross sections taken along a line B1-B2 and a line C1-C2 in FIG. 3A. The line B1-B2 passes through the wiring 52R, the transistor 30R, the capacitor 60R, the wiring 53, and the like. The line C1-C2 passes through the transistor 30G, an intersection portion 55, the capacitor 60G, the wiring 53, and the like.

Note that the components that have been described in Structure example 1 and FIG. 1B will not be described below. Hereinafter, unless otherwise described, layers obtained by processing the same film are denoted by the same reference numeral.

The transistors 30R and 30G are bottom-gate transistors. The capacitor 60R or the like includes the conductive layer 31, the conductive layer 33, and part of the insulating layer 34 between the conductive layers 31 and 33.

There is no insulating layer between the conductive layer 33 functioning as the source and drain electrodes of the transistors and a conductive layer functioning as the wiring 52R and the like. Thus, the wiring 52R is in contact with top and side surfaces of one of the source and the drain of the transistor 30R to be electrically connected to the transistor 30R, for example.

There is no insulating layer between the conductive layer 31 functioning as the gate electrodes of the transistors and a conductive layer functioning as the wiring 51 (not illustrated), the wiring 53, and the like. For example, the wiring 53 is in contact with top and side surfaces of the conductive layer 31 included in the capacitor 60R to be electrically connected to the capacitor 60R.

In FIG. 5, an insulating layer 82 is provided to cover the transistor 30R and the like, and the insulating layer 81 functioning as a planarization film is provided over the insulating layer 82. The insulating layer 82 preferably functions as a protective film that inhibits diffusion of impurities or the like to the transistor 30R and the like. The insulating layer 82 can be formed using an inorganic insulating material, and the insulating layer 81 can be formed using an organic insulating material, for example.

The conductive layer 21 is electrically connected to the conductive layer 33 in a region overlapping with the capacitor 60R through an opening provided in the insulating layers 81 and 82. When the connection portion of the conductive layer 21 and the conductive layer 33 overlaps with the capacitor 60R, the pixel area can be reduced and the display device can have higher resolution.

In a region overlapping with the connection portion of the conductive layer 21 and the conductive layer 33, the cell gap of the liquid crystal element 20 is larger than that in the other regions, in some cases. At the connection portion, the conductive layer 21 is likely to have an uneven top surface; thus, the initial alignment of the liquid crystal 22 at the connection portion differs from that in the other regions, which might cause light leakage. Since light leakage causes a reduction in the contrast, the light-blocking layer 42 is preferably provided in the region overlapping with the connection portion as illustrated in FIG. 5. Note that when the liquid crystal can be sufficiently driven at the connection portion, for example, the connection portion is preferably used as part of the display region without providing the light-blocking layer 42 because the aperture ratio is increased.

Note that since there is no insulating layer between the conductive layer 33 and the conductive layer functioning as the wiring 52G and the wiring 52R, the conductive layers are short circuited when intersecting with each other. To prevent this, two conductive layers 33 at the intersection portion 55 between which the wirings 52G and 52R are provided are each electrically connected to the conductive layer 31 through an opening provided in the insulating layer 34. The conductive layer 31 and the wirings 52G and 52R overlap with each other with the insulating layer 34 provided therebetween. This means that the intersection portion 55 has a bridge structure.

In the intersection portion 55, electrical noise due to the wirings 52G and 52R is transmitted to the conductive layer 31 that overlaps with the wirings 52G and 52R and an image displayed by the liquid crystal element 20G is affected, in some cases. However, the pixel 40 has a structure in which the transistor 30G is not provided in the subpixel 40G; thus, the area of the capacitor 60G can be larger than that of the capacitor 60R. Such a structure can be less influenced by the noise. Since the capacitor 60G transmits visible light, a high aperture ratio can be maintained even when the area of the capacitor 60G is increased. To further reduce the influence of the noise, the area of the intersection portion of the wiring 52G or 52R and the conductive layer 31 is preferably reduced as much as possible and the capacitance therebetween is reduced.

The above is the description of Cross-sectional structure example 2-1.

Structure Example 2-2 of Pixel

Figure 6:
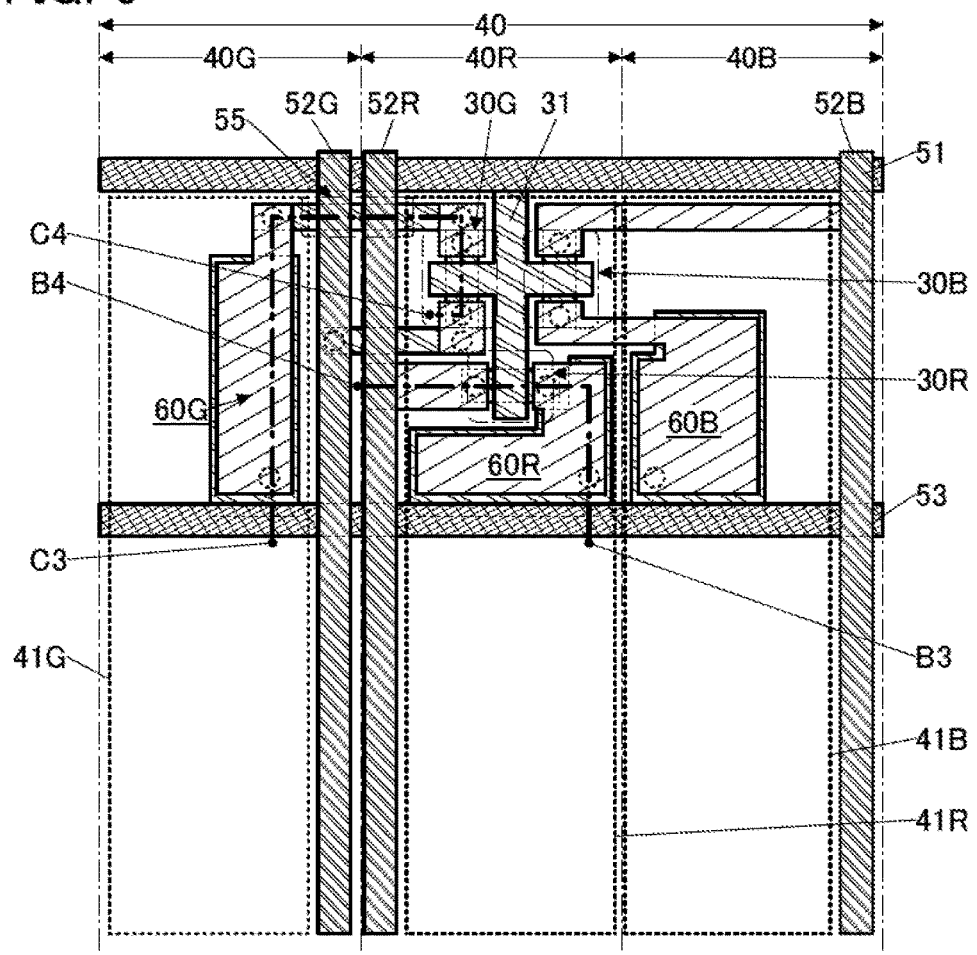
FIG. 6 illustrates a structure example of a display device.

FIG. 6 is a schematic top view that is different from FIG. 3A. Note that FIG. 3B can be referred to for a circuit diagram.

FIG. 6 illustrates an example of a structure in which the transistors 30R, 30G, and 30B are top-gate transistors.

Cross-Sectional Structure Example 2-2

Figure 7:
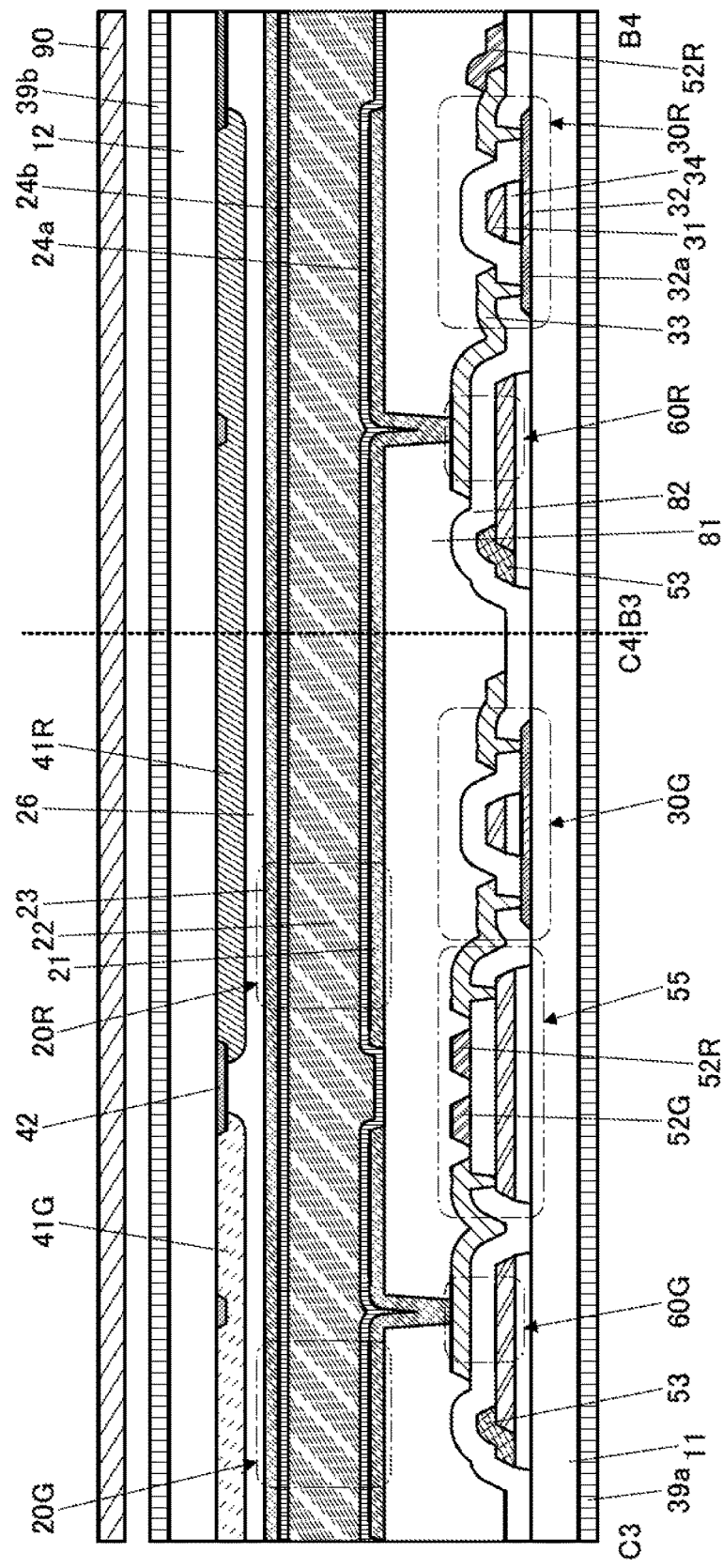
FIG. 7 illustrates a structure example of a display device.

FIG. 7 is a schematic cross-sectional view taken along a line B3-B4 and a line C3-C4 in FIG. 6.

In the transistor 30R, for example, the insulating layer 34 functioning as a gate insulating layer and the conductive layer 31 functioning as a gate electrode are stacked over the semiconductor layer 32. Furthermore, the insulating layer 82 is provided to cover the insulating layer 34 and the conductive layer 31, and the conductive layers 33 functioning as a source electrode and a drain electrode are provided over the insulating layer 82. The semiconductor layer 32 includes low-resistance regions 32a in regions not overlapping with the conductive layer 31. The conductive layers 33 are electrically connected to the low-resistance regions 32a through openings provided in the insulating layer 82.

In the intersection portion 55, the conductive layers 33 between which the wirings 52G and 52R are sandwiched are electrically connected to the conductive layer 31 that intersects with the wirings 52G and 52R with the insulating layer 82 provided therebetween.

A region of the semiconductor layer 32 overlapping with the conductive layer 31 functions as a channel formation region. The channel formation region is sandwiched between the low-resistance regions 32a. The low-resistance regions 32a can have higher carrier concentration or higher impurity concentration than the channel formation region. In the case where an oxide semiconductor (OS) is used for the semiconductor layer 32, the low-resistance regions 32a can each be referred to as an oxide conductor (OC).

Structure Example 2-3 of Pixel

Figure 8:
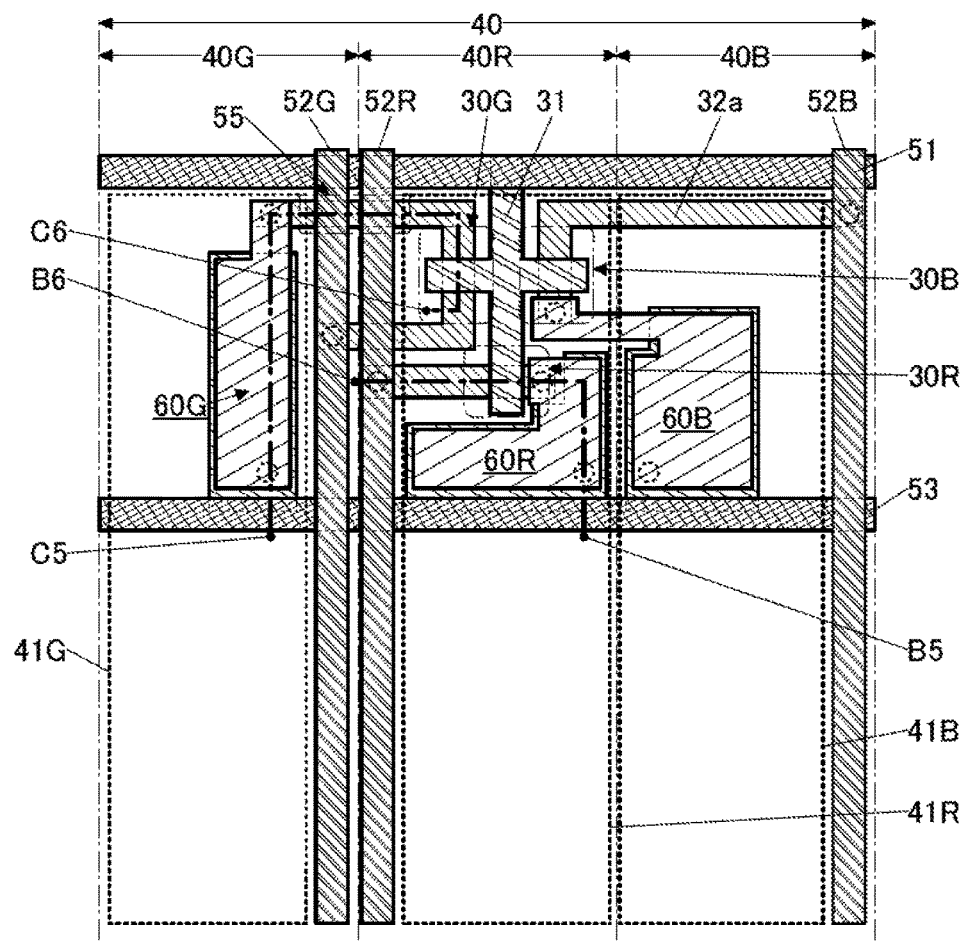
FIG. 8 illustrates a structure example of a display device.

FIG. 8 is a schematic top view that is partly different from FIG. 6. Note that FIG. 3B can be referred to for a circuit diagram.

The structure illustrated in FIG. 8 is different from that in FIG. 6 mainly in that part of the low-resistance regions 32a is used as a wiring in a subpixel.

Cross-Sectional Structure Example 2-3

Figure 9:
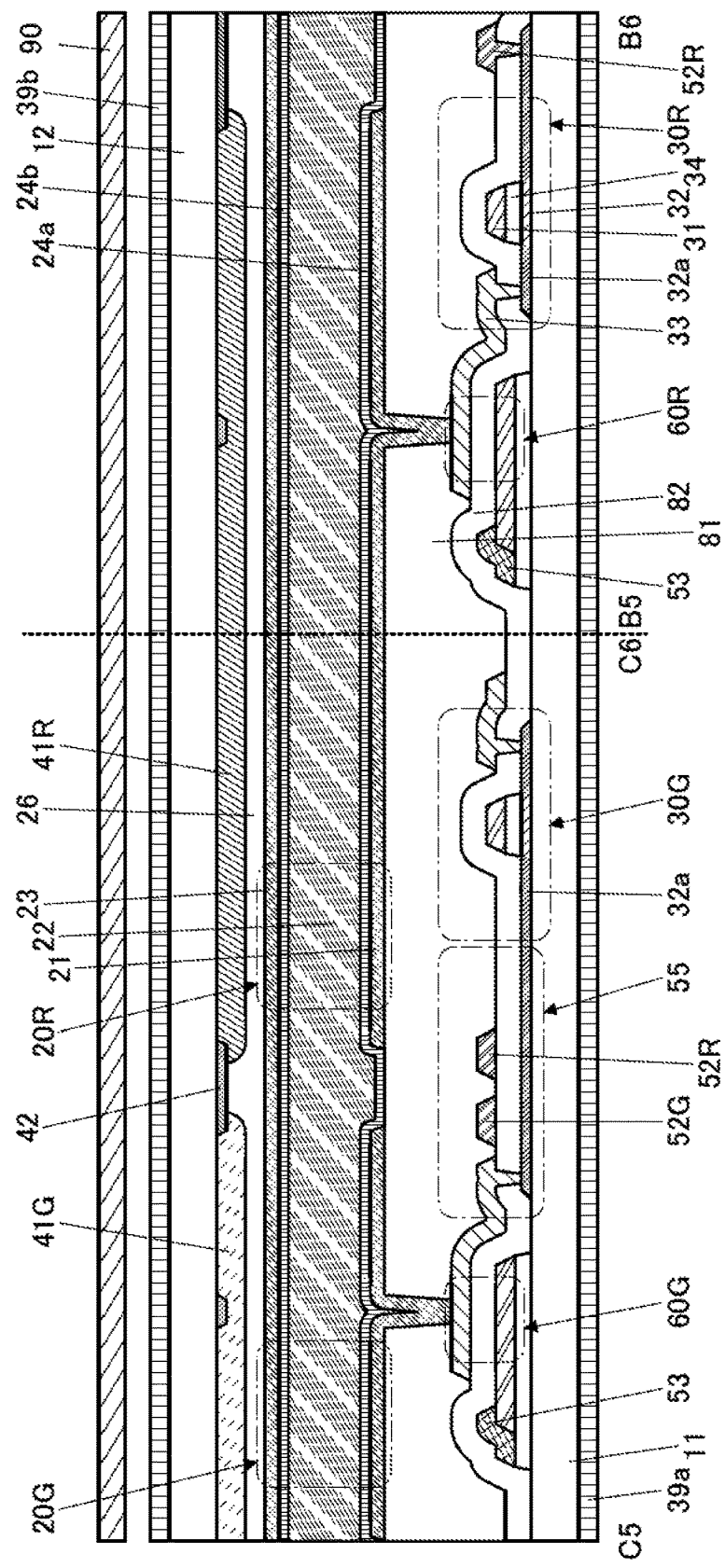
FIG. 9 illustrates a structure example of a display device.

FIG. 9 is a schematic cross-sectional view taken along a line B5-B6 and a line C5-C6 in FIG. 8.

As for the transistor 30R, for example, part of the low-resistance regions 32a is electrically connected to the wiring 52R without through the conductive layer 33.

As for the transistor 30G, part of the low-resistance regions 32a intersects with the wirings 52R and 52G and is electrically connected to the conductive layer 33 functioning as one electrode of the capacitor 60G.

When part of the low-resistance regions 32a of the semiconductor layer 32 is used as a wiring in the pixel as described above, the number of contact portions can be smaller than that in the structure illustrated in FIG. 6 and FIG. 7, for example. Thus, a higher-resolution display device can be fabricated.

Modification Example

In each of the above examples, a vertical electric field mode liquid crystal element in which a pair of electrodes is provided over and under a liquid crystal is used as the liquid crystal element: the structure of the liquid crystal element is not limited thereto and any of a variety of liquid crystal elements can be used.

FIG. 10A is a schematic cross-sectional view of a display device including a liquid crystal element using a fringe field switching (FFS) mode.

The liquid crystal element 20R or the like includes the conductive layer 21 functioning as a pixel electrode and the conductive layer 23 overlapping with the conductive layer 21 with an insulating layer 83 provided therebetween. The conductive layer 21 has a slit-like or comb-like top surface.

In such a structure, a capacitor, which can be used as a storage capacitor, is formed in a region where the conductive layer 21 and the conductive layer 23 overlap with each other. Thus, the capacitor 60R or the like does not need to be provided, in which case the area occupied by the pixel 40 can be reduced, leading to a high-resolution display device.

Although FIG. 10A illustrates the structure in which the conductive layer 21 functioning as the pixel electrode is on the liquid crystal 22 side, a structure in which the conductive layer 23 functioning as a common electrode is on the liquid crystal 22 side may be employed as illustrated in FIG. 10B.

Note that the structures of the transistors 30R and 30G, the intersection portion 55, and the like are not limited to those illustrated here and can be interchanged with the structures described above as examples as appropriate.

Structure Example 3

In the above examples, the coloring layers and the like are provided on the substrate 12 side; however, the coloring layers and the like can be provided on the substrate 11 side so that the structure on the substrate 12 side can be simplified. Furthermore, the bonding between the substrate 11 and the substrate 12 does not require high alignment accuracy, leading to an increase in productivity.

Cross-Sectional Structure Example 3-1

Figure 11:
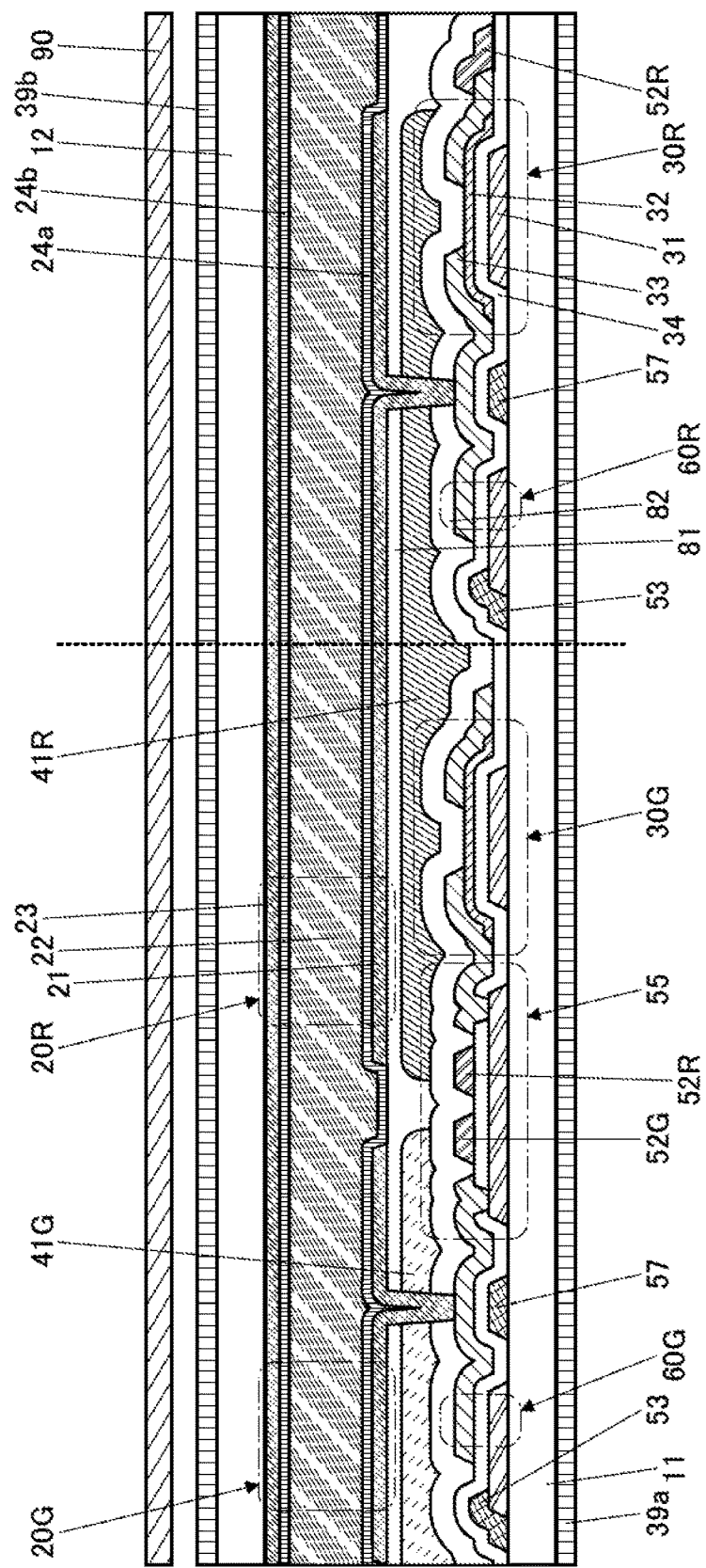
FIG. 11 illustrates a structure example of a display device.

FIG. 11 is a schematic cross-sectional view described below as an example. The structure illustrated in FIG. 11 is different from that in FIG. 5 mainly in that the coloring layers 41R and 41G and the like are provided on the substrate 11 side.

In FIG. 11, the coloring layers 41R and 41G are positioned between the insulating layer 82 and the insulating layer 81. The coloring layer 41R is provided to cover the transistor 30G, the transistor 30R, the transistor 30B (not illustrated), the capacitor 60R, and the like. Furthermore, the coloring layer 41G is provided to cover the capacitor 60G.

The substrate 12 is provided with the conductive layer 23 and the alignment film 24b on the substrate 11 side. The conductive layer 23 and the alignment film 24b can be provided in the entire display region and minute processing is unnecessary; thus, the structure can be simplified as compared with the case of forming the coloring layer 41R and the like.

As mentioned above, the contact portion of the conductive layer 21 functioning as a pixel electrode and another conductive layer might cause light leakage. Accordingly, the contact portion is preferably covered by a light-blocking layer. However, when the light-blocking layer is provided on the substrate 12 side as illustrated in FIG. 5 and the like, the bonding between the substrate 11 and the substrate 12 requires high alignment accuracy, in which case an effect obtained by providing the coloring layers on the substrate 11 side is reduced. Thus, the light-blocking layer is preferably provided on the substrate 11 side.

In FIG. 11, a light-blocking layer 57 having a light-blocking property is provided in a region overlapping with the contact portion. The light-blocking layer 57 can be formed by processing the same conductive film as the wirings 53 and 51 and the like, for example, and thus can be formed without increasing the number of steps.

When the light-blocking layer 57 has conductivity, the light-blocking layer 57 can be formed to have an island shape to be electrically insulated from other wirings and electrodes. In other words, the light-blocking layer 57 can be electrically floating. Alternatively, the light-blocking layer 57 may function as one electrode of the capacitor 60R, for example. Further alternatively, the contact portion may be positioned to overlap with the wiring 51, so that part of the wiring 51 can also function as the light-blocking layer 57.

Figure 12:
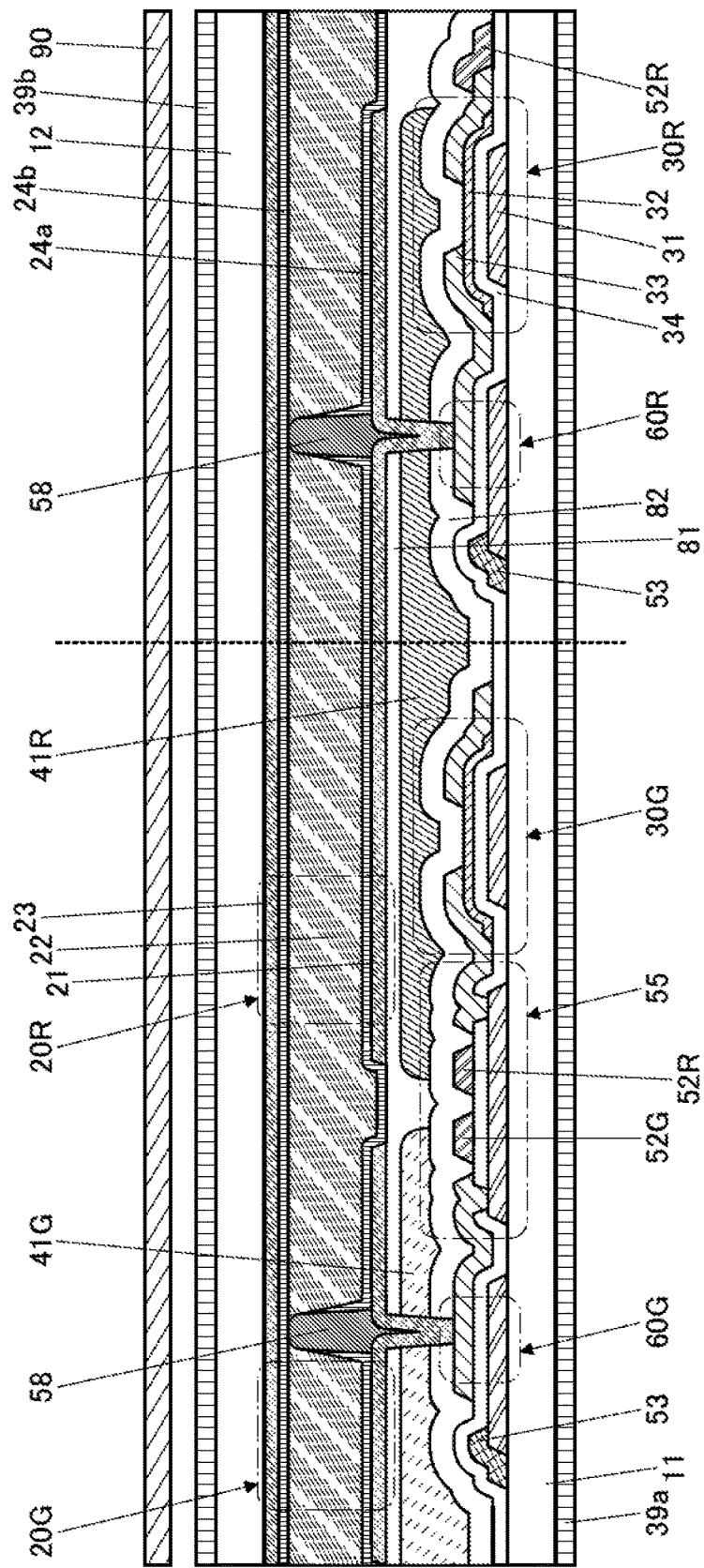
FIG. 12 illustrates a structure example of a display device.

FIG. 12 illustrates an example where a light-blocking layer 58 is provided instead of the light-blocking layer 57 in FIG. 11.

The light-blocking layer 58 is provided over the contact portion of the conductive layer 21. The light-blocking layer 58 has a function of blocking visible light or absorbing at least part of visible light.

The light-blocking layer 58 can function as a gap spacer for keeping the distance between the substrate 11 and the substrate 12. Thus, when an external force is applied (e.g., when a display surface is pushed or a display device is bent) or when the display device is oscillated, for example, the cell gap of the liquid crystal element 20R or the like is less likely to be changed; as a result, interference, a change in color, and the like due to the change of the cell gap are unlikely to occur.

To prevent an electrical short circuit between the conductive layer 21 and the conductive layer 23, at least the top surface of the light-blocking layer 58 preferably has an insulating property.

For example, a resin containing a pigment, dye, carbon black, or the like can be used for the light-blocking layer 58. When the resin has conductivity, a two-layer structure in which the resin is covered by an insulating film may be employed. In the case where the alignment film 24a has a sufficient insulating property and covers the light-blocking layer 58 properly, the top surface of the light-blocking layer 58 can have conductivity.

The light-blocking layer 58 can be provided on the substrate 12 side, in which case, however, the bonding between the substrate 11 and the substrate 12 requires high alignment accuracy. Thus, the light-blocking layer 58 is preferably provided on the substrate 11 side as illustrated in FIG. 12.

Structure Example 4

Although FIGS. 3A and 3B illustrate the structure in which one gate line and three source lines are connected to the pixel 40, one embodiment of the present invention is not limited thereto. An example of a structure in which three gate lines are connected to the pixel 40 will be described below.

Structure Example 4 of Pixel

Figure 13A:
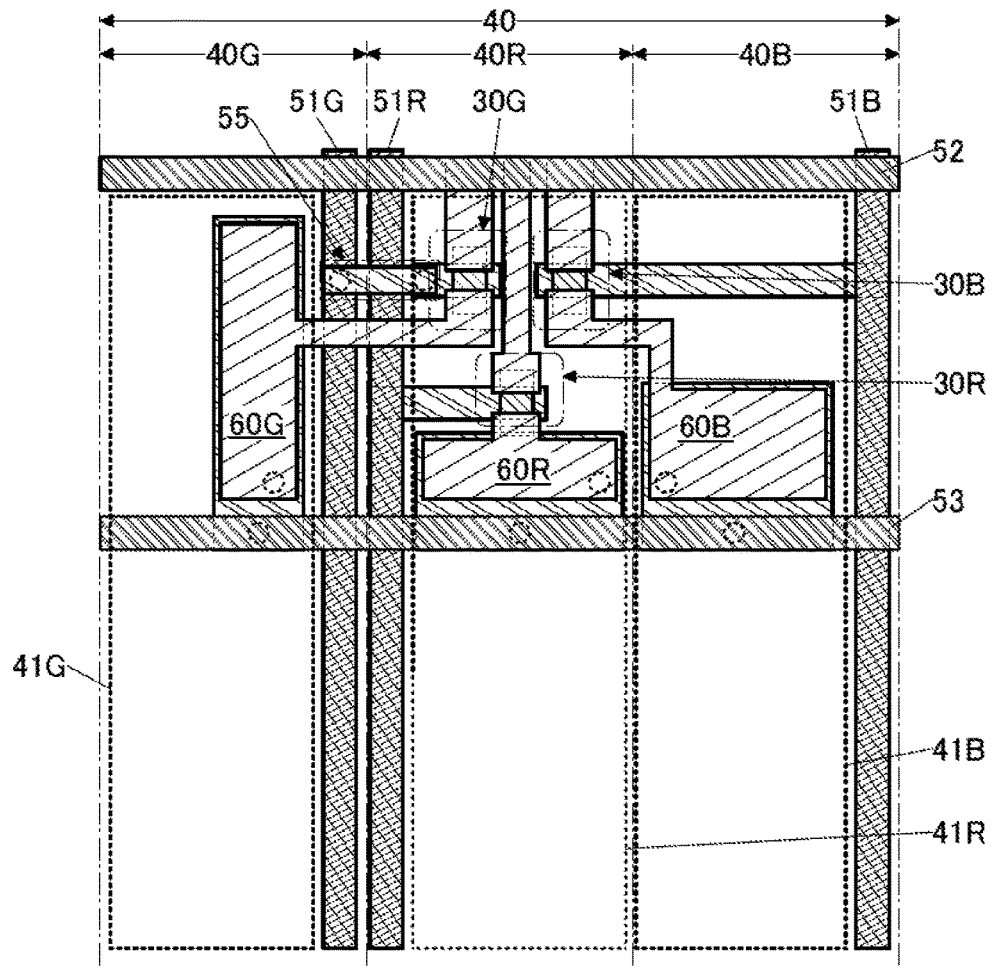
FIGS. 13A and 13B illustrate a structure example of a display device.

To the pixel 40 illustrated in FIG. 13A, a wiring 51G, a wiring 51R, and a wiring 51B each functioning as a gate line, a wiring 52 functioning as a source line, and the wiring 53 functioning as a power line are connected.

As with FIG. 3A, FIG. 13A illustrates the case where bottom-gate transistors are used.

The transistors 30R, 30G, and 30B and the capacitor 60R overlap with the coloring layer 41R. The capacitor 60G and the capacitor 60B overlap with the coloring layer 41G and the coloring layer 41B, respectively.

Figure 13B:
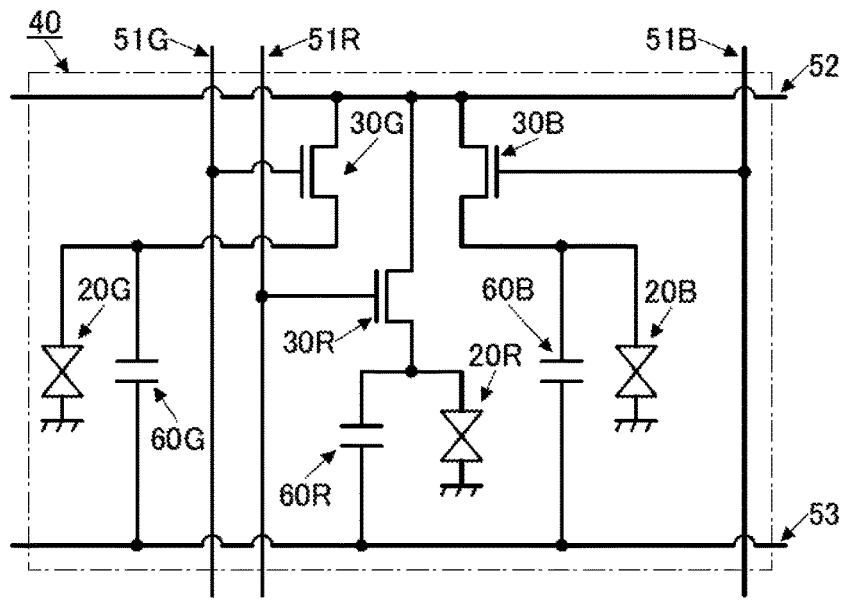

FIG. 13B is a circuit diagram of the pixel 40 illustrated in FIG. 13A.

In the transistor 30R, a gate is electrically connected to the wiring 51R, one of a source and a drain is electrically connected to the wiring 52, and the other of the source and the drain is electrically connected to one electrode of the capacitor 60R and one electrode (pixel electrode) of the liquid crystal element 20R.

In the transistor 30G, a gate intersects with the wiring 51R and is electrically connected to the wiring 51G, one of a source and a drain is electrically connected to the wiring 52, and the other of the source and the drain intersects with the wirings 51R and 51G and is electrically connected to one electrode of the capacitor 60G and a pixel electrode of the liquid crystal element 20G.

In the transistor 30B, a gate is electrically connected to the wiring 51B, one of a source and a drain is electrically connected to the wiring 52, and the other of the source and the drain is electrically connected to one electrode of the capacitor 60B and a pixel electrode of the liquid crystal element 20B.

The other electrodes of the capacitors 60R, 60G, and 60B are electrically connected to the wiring 53.

Structure Example 5

The above structure described as an example includes the intersection portion where the gate or one of the source and the drain of the transistor 30G intersects with a wiring. In the intersection portion, electrical noise from the wiring might affect display. Accordingly, a structure without the intersection portion is further preferable.

Structure Example 5-1 of Pixel

Figure 14A:
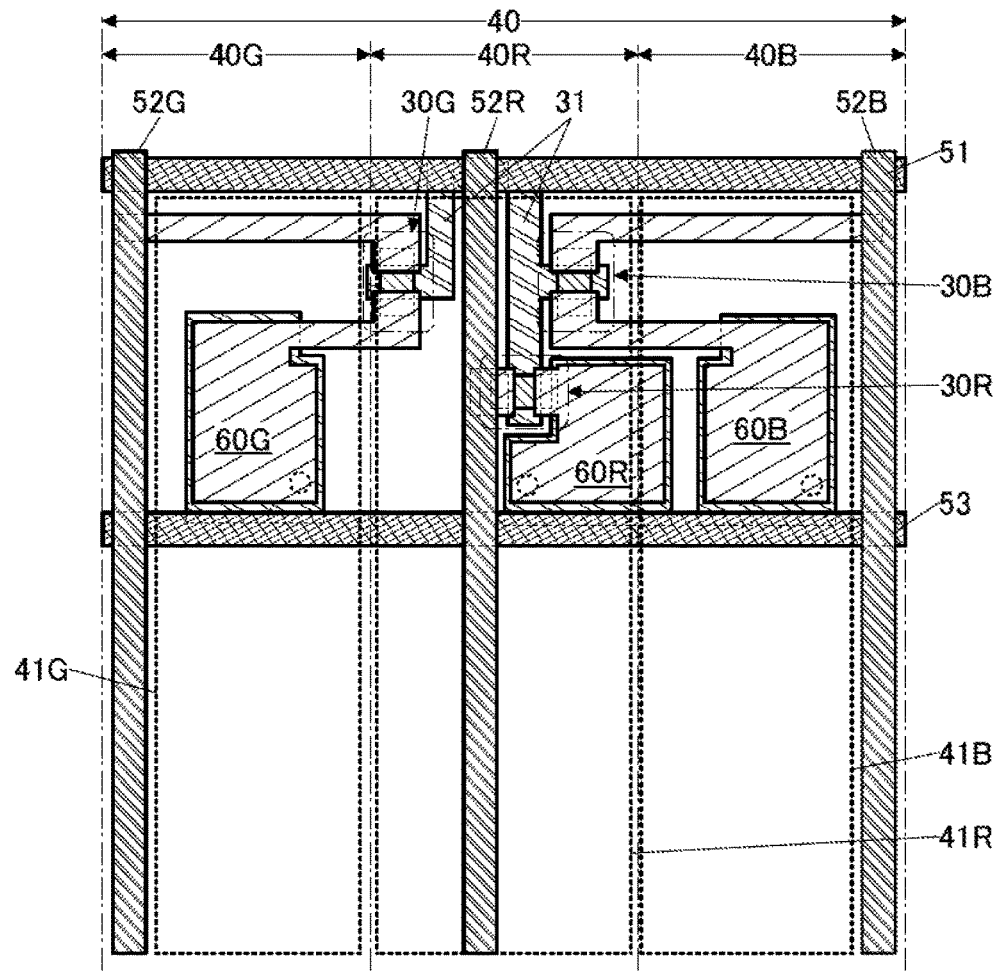
FIGS. 14A and 14B illustrate a structure example of a display device.

The structure illustrated in FIG. 14A is different from that in FIG. 3A mainly in that, for example, the wiring 52R is provided between the transistor 30G and the transistor 30B and the intersection portion 55 is not included.

In FIG. 14A, the transistors 30R and 30B are positioned between the wiring 52R and the wiring 52B, and the transistor 30G is positioned between the wiring 52R and the wiring 52G. The wiring 52R has a region overlapping with the coloring layer 41R.

In FIG. 14A, the wiring 52R is positioned in a longitudinal direction along a region where the coloring layer 41R is provided. When the wiring 52R has a light-blocking property, a display region of the subpixel 40R has a non-display region (light-blocking region) extending in the longitudinal direction. Thus, the width of the coloring layer 41R in a lateral direction is preferably set large in consideration of the width of the wiring 52R.

With such a structure, the intersection portion is unnecessary and the wirings 52G, 52R, and 52B can be more apart from one another than those in FIG. 3A and the like. Accordingly, parasitic capacitance between the wirings can be reduced. For this reason, this structure is suitable for displaying an image with a higher frame frequency.

Figure 14B:
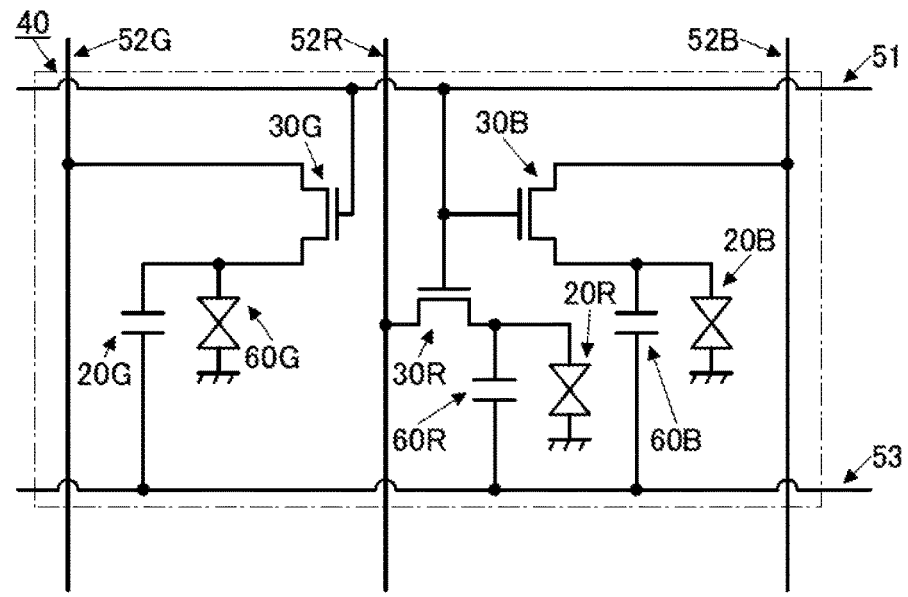

FIG. 14B is a circuit diagram of the pixel 40 illustrated in FIG. 14A.

In the transistor 30R, a gate is electrically connected to the wiring 51, one of a source and a drain is electrically connected to the wiring 52R, and the other of the source and the drain is electrically connected to one electrode of the capacitor 60R and one electrode (pixel electrode) of the liquid crystal element 20R.

In the transistor 30G, a gate is electrically connected to the wiring 51, one of a source and a drain is electrically connected to the wiring 52G, and the other of the source and the drain is electrically connected to one electrode of the capacitor 60G and a pixel electrode of the liquid crystal element 20G.

In the transistor 30B, a gate is electrically connected to the wiring 51, one of a source and a drain is electrically connected to the wiring 52B, and the other of the source and the drain is electrically connected to one electrode of the capacitor 60B and a pixel electrode of the liquid crystal element 20B.

Structure Example 5-2 of Pixel

Figure 15A:
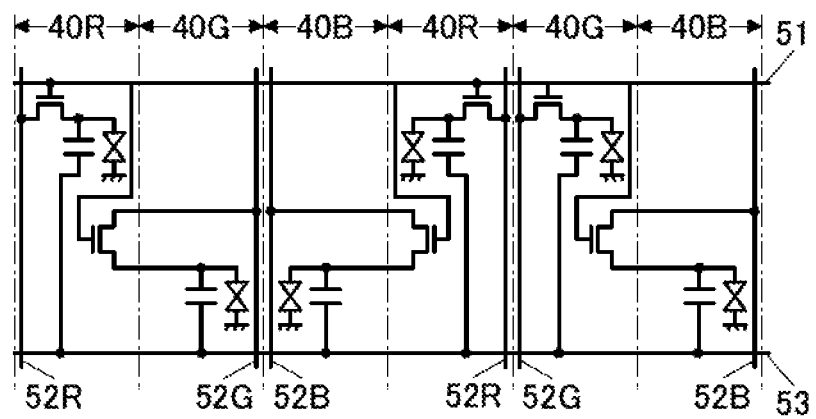
FIGS. 15A and 15B illustrate a structure example of a display device.

FIG. 15A is a circuit diagram of a structure described below. FIG. 15A illustrates a pixel unit 40U including six subpixels. A display region can consist of the pixel units 40U arranged in a matrix.

In the pixel unit 40U illustrated in FIG. 15A, from the left, the subpixel 40R and the subpixel 40G are provided between the wiring 52R and the wiring 52G, the wiring 52B is provided adjacent to the wiring 52G, the subpixel 40B and the other subpixel 40R are provided between the wiring 52B and the other wiring 52R, the other wiring 52G is provided adjacent to the other wiring 52R, and the other subpixel 40G and the other subpixel 40B are provided between the other wiring 52G and the other wiring 52B.

Adjacent two subpixels each include at least one transistor. The two transistors are provided to overlap with one of two coloring layers included in the two subpixels. It is preferable that the transistors be provided to overlap with one of the coloring layers that absorbs light with a shorter wavelength.

Assume that the coloring layer 41R transmits red light, the coloring layer 41G transmits green light, and the coloring layer 41B transmits blue light, for example. In the case of the pair of the subpixel 40R and the subpixel 40G and the pair of the subpixel 40R and the subpixel 40B, two transistors are provided to overlap with the coloring layer 41R that transmits red light. Meanwhile, in the case of the pair of the subpixel 40G and the subpixel 40B, two transistors are provided to overlap with the coloring layer 41G that transmits green light.

Figure 15B:
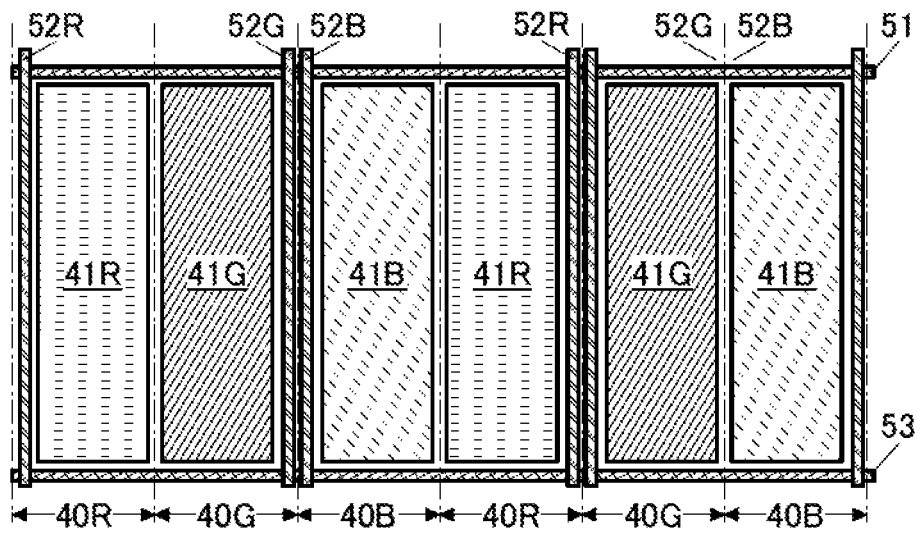

In the case of the circuit diagram illustrated in FIG. 15A, for example, the coloring layers 41R, 41G, and 41B are arranged as illustrated in FIG. 15B.

Structure Example 5-3 of Pixel

Figure 16A:
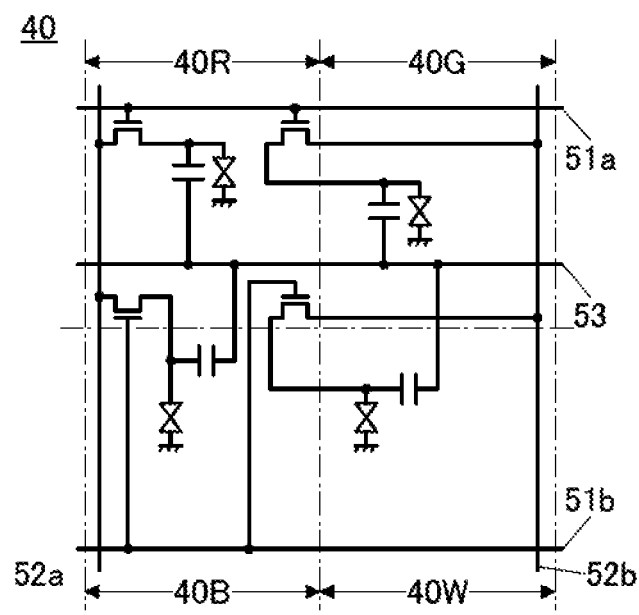
FIGS. 16A and 16B illustrate a structure example of a display device.

The pixel 40 illustrated in FIG. 16A includes four subpixels including a subpixel 40W. Two gate lines (wirings 51a and 51b), two source lines (wirings 52a and 52b), and one power line (the wiring 53) are connected to the pixel 40. In the pixel 40, four subpixels are arranged in a 2×2 matrix in a region surrounded by the wirings 51a, 51b, 52a, and 52b.

The subpixel 40W is a subpixel that emits white light, for example. Thus, the subpixel 40W does not necessarily include a coloring layer.

The pixel 40 includes at least four transistors. The four transistors each function as a selection transistor of the corresponding subpixel. The four transistors are provided to overlap with the coloring layer 41R.

Figure 16B:
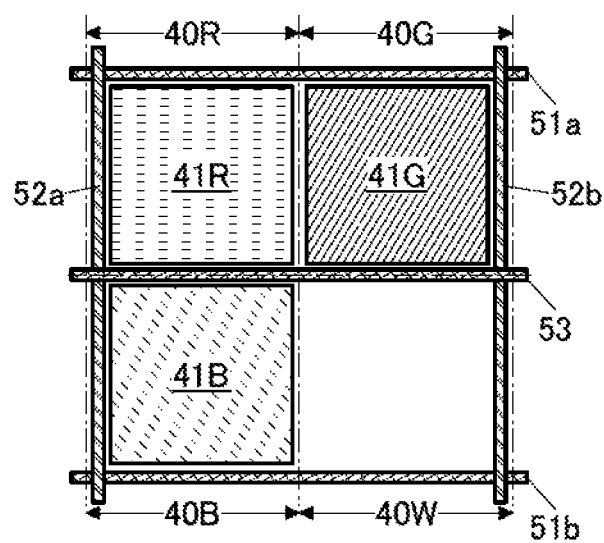

In the case of the circuit diagram in FIG. 16A, for example, coloring layers are arranged as illustrated in FIG. 16B. There is no coloring layer in a region where the subpixel 40W is provided.

The above is the description of the structural examples of the display device.

[Components]

The above-described components will be described below.

<Substrate>

A material having a flat surface can be used as the substrate included in the display panel. The substrate on the side from which light from the display element is extracted is formed using a material transmitting the light. For example, a material such as glass, quartz, ceramics, sapphire, or an organic resin can be used.

The weight and thickness of the display panel can be reduced by using a thin substrate. A flexible display panel can be obtained by using a substrate that is thin enough to have flexibility. Alternatively, glass or the like that is thin enough to have flexibility can be used as the substrate. Alternatively, a composite material where glass and a resin material are attached to each other with an adhesive layer may be used.

<Transistor>

The transistor includes a conductive layer serving as a gate electrode, a semiconductor layer, a conductive layer serving as a source electrode, a conductive layer serving as a drain electrode, and an insulating layer serving as a gate insulating layer.

Note that there is no particular limitation on the structure of the transistor included in the display device of one embodiment of the present invention. For example, a planar transistor, a staggered transistor, or an inverted staggered transistor can be used. A top-gate transistor or a bottom-gate transistor may also be used. Gate electrodes may be provided above and below a channel.

There is no particular limitation on the crystallinity of a semiconductor material used for the transistors, and an amorphous semiconductor or a semiconductor having crystallinity (a microcrystalline semiconductor, a polycrystalline semiconductor, a single crystal semiconductor, or a semiconductor partly including crystal regions) may be used. It is preferred that a semiconductor having crystallinity be used, in which case deterioration of the transistor characteristics can be suppressed.

As a semiconductor material used for the transistor, a metal oxide whose energy gap is greater than or equal to 2 eV, preferably greater than or equal to 2.5 eV, further preferably greater than or equal to 3 eV can be used. A typical example is a metal oxide containing indium, and a CAC-OS described later can be used, for example.

Because of a low off-state current of a transistor that contains a metal oxide having a larger band gap and a lower carrier density than silicon, charge stored in a capacitor connected in series with the transistor can be held for a long time.

The semiconductor layer can be, for example, a film represented by an In-M-Zn-based oxide that contains indium, zinc, and M (a metal such as aluminum, titanium, gallium, germanium, yttrium, zirconium, lanthanum, cerium, tin, neodymium, or hafnium).

In the case where the metal oxide contained in the semiconductor layer is an In-M-Zn-based oxide, the atomic ratio of metal elements of a sputtering target used for forming a film of the In-M-Zn oxide preferably satisfy In≥M and Zn≥M. The atomic ratio of the metal elements (In:M: Zn) in such a sputtering target is preferably 1:1:1, 1:1:1.2, 3:1:2, 4:2:3, 4:2:4.1, 5:1:6, 5:1:7, or 5:1:8, for example. Note that the atomic ratio of the metal elements in the formed oxide semiconductor layer varies from the above atomic ratios of the metal elements of the sputtering targets in a range of ±40%.

The bottom-gate transistor described in this embodiment is preferable because the number of manufacturing steps can be reduced. When a metal oxide, which can be formed at a lower temperature than polycrystalline silicon, is used for the bottom-gate transistor, materials with low heat resistance can be used for a wiring, an electrode, or a substrate below the semiconductor layer; thus, the range of choices of materials can be widened. For example, an extremely large glass substrate can be favorably used.

A metal oxide film with low carrier density is used as the semiconductor layer. For example, the semiconductor layer is a metal oxide whose carrier density is lower than or equal to $1\times10^{17}/\text{cm}^3$, preferably lower than or equal to $1\times10^{15}/\text{cm}^3$, further preferably lower than or equal to $1\times10^{13}/\text{cm}^3$, still further preferably lower than or equal to $1\times10^{11}/\text{cm}^3$, even further preferably lower than $1\times10^{10}/\text{cm}^3$, and higher than or equal to $1\times10^{-9}/\text{cm}^3$. Such a metal oxide is referred to as a highly purified intrinsic or substantially highly purified intrinsic metal oxide. The metal oxide has a low impurity concentration and a low density of defect states and can thus be referred to as a metal oxide having stable characteristics.

Note that, without limitation to those described above, a material with an appropriate composition may be used depending on required semiconductor characteristics and electrical characteristics (e.g., field-effect mobility and threshold voltage) of a transistor. To obtain the required semiconductor characteristics of the transistor, it is preferable that the carrier density, the impurity concentration, the defect density, the atomic ratio between a metal element and oxygen, the interatomic distance, the density, and the like of the semiconductor layer be set to appropriate values.

When silicon or carbon that is one of elements belonging to Group 14 is contained in the metal oxide contained in the semiconductor layer, oxygen vacancies are increased in the semiconductor layer, and the semiconductor layer becomes n-type. Thus, the concentration of silicon or carbon (measured by secondary ion mass spectrometry) in the semiconductor layer is lower than or equal to $2\times10^{18}$ atoms/cm$^3$, preferably lower than or equal to $2\times10^{17}$ atoms/cm$^3$.

Alkali metal and alkaline earth metal might generate carriers when bonded to a metal oxide, in which case the off-state current of the transistor might be increased. Therefore, the concentration of alkali metal or alkaline earth metal of the semiconductor layer, which is measured by secondary ion mass spectrometry, is lower than or equal to $1\times10^{18}$ atoms/cm$^3$, preferably lower than or equal to $2\times10^{16}$ atoms/cm$^3$.

When nitrogen is contained in the metal oxide contained in the semiconductor layer, electrons serving as carriers are generated and the carrier density increases, so that the semiconductor layer easily becomes n-type. Thus, a transistor including a metal oxide which contains nitrogen is likely to be normally on. Hence, the concentration of nitrogen in the semiconductor layer which is measured by secondary ion mass spectrometry is preferably lower than or equal to $5\times10^{18}$ atoms/cm$^3$.

An oxide semiconductor is classified into a single crystal oxide semiconductor and a non-single-crystal oxide semiconductor. Examples of a non-single-crystal oxide semiconductor include a c-axis-aligned crystalline oxide semiconductor (CAAC-OS), a polycrystalline oxide semiconductor, a nanocrystalline oxide semiconductor (nc-OS), an amorphous-like oxide semiconductor (a-like OS), and an amorphous oxide semiconductor.

For the semiconductor layer of the transistor disclosed in one embodiment of the present invention, a cloud-aligned composite oxide semiconductor (CAC-OS) may be used.

Note that the above-described non-single-crystal oxide semiconductor or CAC-OS can be suitably used for the semiconductor layer of the transistor disclosed in one embodiment of the present invention. As the non-single-crystal oxide semiconductor, the nc-OS or the CAAC-OS can be suitably used.

In one embodiment of the present invention, the CAC-OS is preferably used for the semiconductor layer of the transistor. With the use of the CAC-OS, the transistor can have excellent electric characteristics or high reliability.

The semiconductor layer may be a mixed film including two or more of the following: a region of a CAAC-OS, a region of a polycrystalline oxide semiconductor, a region of an nc-OS, a region of an amorphous-like oxide semiconductor, and a region of an amorphous oxide semiconductor. The mixed film has, for example, a single-layer structure or a stacked-layer structure including two or more of the above-described regions in some cases.

<Composition of CAC-OS>

Described below is the composition of a cloud-aligned composite oxide semiconductor (CAC-OS) applicable to a transistor disclosed in one embodiment of the present invention.

The CAC-OS has, for example, a composition in which elements included in a metal oxide are unevenly distributed. Materials including unevenly distributed elements each have a size of greater than or equal to 0.5 nm and less than or equal to 10 nm, preferably greater than or equal to 1 nm and less than or equal to 2 nm, or a similar size. Note that in the following description of a metal oxide, a state in which one or more metal elements are unevenly distributed and regions including the metal element(s) are mixed is referred to as a mosaic pattern or a patch-like pattern. The region has a size of greater than or equal to 0.5 nm and less than or equal to 10 nm, preferably greater than or equal to 1 nm and less than or equal to 2 nm, or a similar size.

Note that a metal oxide preferably contains at least indium. In particular, indium and zinc are preferably contained. In addition, one or more of aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide ($\text{InO}_{X1}$, where X1 is a real number greater than 0) or indium zinc oxide ($\text{In}_{X2}\text{Zn}_{Y2}\text{O}_{Z2}$, where X2, Y2, and Z2 are real numbers greater than 0), and gallium oxide ($\text{GaO}_{X3}$, where X3 is a real number greater than 0) or gallium zinc oxide ($\text{Ga}_{X4}\text{Zn}_{Y4}\text{O}_{Z4}$, where X4, Y4, and Z4 are real numbers greater than 0), and a mosaic pattern is formed. Then, $\text{InO}_{X1}$ or $\text{In}_{X2}\text{Zn}_{Y2}\text{O}_{Z2}$ forming the mosaic pattern is evenly distributed in the film. This composition is also referred to as a cloud-like composition.

That is, the CAC-OS is a composite metal oxide with a composition in which a region including $\text{GaO}_{X3}$ as a main component and a region including $\text{In}_{X2}\text{Zn}_{Y2}\text{O}_{Z2}$ or $\text{InO}_{X1}$ as a main component are mixed. Note that in this specification, for example, when the atomic ratio of In to an element M in a first region is greater than the atomic ratio of In to an element M in a second region, the first region has higher In concentration than the second region.

Note that a compound including In, Ga, Zn, and O is also known as IGZO. Typical examples of IGZO include a crystalline compound represented by $\text{InGaO}_3(\text{ZnO})_{m1}$ (m1 is a natural number) and a crystalline compound represented by $\text{In}_{(1+x0)}\text{Ga}_{(1-x0)}\text{O}_3(\text{ZnO})_{m0}$ ($-1 \leq x0 \leq 1$; m0 is a given number).

The above crystalline compounds have a single crystal structure, a polycrystalline structure, or a CAAC structure. Note that the CAAC structure is a crystal structure in which a plurality of IGZO nanocrystals have c-axis alignment and are connected in the a-b plane direction without alignment.

On the other hand, the CAC-OS relates to the material composition of a metal oxide. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part thereof, and these nanoparticle regions are randomly dispersed to form a mosaic pattern in the CAC-OS.

The CAC-OS can be formed by a sputtering method under conditions where a substrate is not intentionally heated, for example. In the case of forming the CAC-OS by a sputtering method, one or more selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible, and for example, the flow ratio of an oxygen gas is preferably higher than or equal to 0% and less than 30%, further preferably higher than or equal to 0% and less than or equal to 10%.

The CAC-OS is characterized in that no clear peak is observed in measurement using θ/2θ scan by an out-of-plane method, which is an X-ray diffraction (XRD) measurement method. That is, X-ray diffraction shows no alignment in the a-b plane direction and the c-axis direction in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in plan-view and cross-sectional directions.

For example, an energy dispersive X-ray spectroscopy (EDX) mapping image confirms that an In—Ga—Zn oxide with the CAC composition has a structure in which a region including $GaO_{X3}$ as a main component and a region including $In_{X2}Zn_{Y2}O_{Z2}$ or $InO_{X1}$ as a main component are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of a metal oxide is exhibited. Accordingly, when regions including $In_{X2}Zn_{Y2}O_{Z2}$ or $InO_{X1}$ as a main component are distributed in a metal oxide like a cloud, high field-effect mobility (μ) can be achieved.

By contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in a metal oxide, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby high on-state current (Ion) and high field-effect mobility (μ) can be achieved.

A semiconductor element including a CAC-OS has high reliability. Thus, the CAC-OS is suitably used in a variety of semiconductor devices typified by a display.

Since a transistor including a CAC-OS in a semiconductor layer has high field-effect mobility and high driving capability, the use of the transistor in a scan line driver circuit (typically, a scan line driver circuit that generates a gate signal) allows a display device to have a narrow bezel. Moreover, the use of the transistor in a signal line driver circuit that is included in a display device and supplies a signal from a signal line (particularly in a demultiplexer connected to an output terminal of a shift register included in the signal line driver circuit) can reduce the number of wirings connected to the display device.

The transistor including a CAC-OS in the semiconductor layer does not need a laser crystallization step necessary for a transistor including low-temperature polysilicon. Thus, the manufacturing cost of a display device can be reduced even when the display device is formed using a large substrate. In addition, it is preferable to use the transistor including a CAC-OS in the semiconductor layer for a driver circuit and a display portion in a large display device having high resolution such as ultra-high definition ("4K resolution," "4K2K," and "4K") or super high definition ("8K resolution," "8K4K," and "8K"), in which case writing can be performed in a short time and display defects can be reduced.

Alternatively, silicon may be used as a semiconductor in which a channel of a transistor is formed. Although amorphous silicon may be used as silicon, it is particularly preferable to use silicon having crystallinity. For example, microcrystalline silicon, polycrystalline silicon, single-crystal silicon, or the like is preferably used. In particular, polycrystalline silicon can be formed at a lower temperature than single-crystal silicon and has higher field-effect mobility and higher reliability than amorphous silicon.

The bottom-gate transistor described in this embodiment is preferable because the number of manufacturing steps can be reduced. When amorphous silicon, which can be formed at a lower temperature than polycrystalline silicon, is used for the semiconductor layer, materials with low heat resistance can be used for a wiring, an electrode, or a substrate below the semiconductor layer, resulting in wider choice of materials. For example, an extremely large glass substrate can be favorably used. Meanwhile, the top-gate transistor is preferable because an impurity region is easily formed in a self-aligned manner and variation in characteristics can be reduced. The top-gate transistor is particularly preferable when polycrystalline silicon, single-crystal silicon, or the like is employed.

<Conductive Layer>

As materials for the gates, the source, and the drain of a transistor having a light-blocking property, and the conductive layers serving as the wirings and electrodes included in the display device, any of metals such as aluminum, titanium, chromium, nickel, copper, yttrium, zirconium, molybdenum, silver, tantalum, and tungsten, or an alloy containing any of these metals as its main component can be used. A single-layer structure or a stacked-layer structure including a film containing any of these materials can be used. For example, the following structures can be given: a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, and a three-layer structure in which a molybdenum film or a molybdenum nitride film, an aluminum film or a copper film, and a molybdenum film or a molybdenum nitride film are stacked in this order. Note that an oxide such as indium oxide, tin oxide, or zinc oxide may be used. Copper containing manganese is preferably used because controllability of a shape by etching is increased.

As a light-transmitting conductive material that can be used for the gate, source, and drain of the transistor having a light-transmitting property and conductive layers such as wirings and electrodes included in the display device, a conductive oxide such as indium oxide, an indium tin oxide, an indium zinc oxide, zinc oxide, or zinc oxide to which gallium is added or graphene can be used. Alternatively, a metal material such as gold, silver, platinum, magnesium, nickel, tungsten, chromium, molybdenum, iron, cobalt, copper, palladium, or titanium, or an alloy material containing the metal material can be used. Further alternatively, a nitride of the metal material (e.g., titanium nitride) or the like may be used. In the case of using the metal material or the alloy material (or the nitride thereof), the thickness is set small enough to be able to transmit light. A stacked film of any of the above materials can be used for the conductive layers. For example, a stacked film of an indium tin oxide and an alloy of silver and magnesium is preferably used because the conductivity can be increased. They can also be used for conductive layers such as wirings and electrodes included in the display device, and conductive layers (e.g., a conductive layer functioning as a pixel electrode or a common electrode) included in a display element.

An oxide semiconductor (oxide conductor: OC) whose resistance is lowered by adding an impurity element, for example, is preferably used as the light-transmitting conductive material.

<Insulating Layer>

Examples of an insulating material that can be used for the insulating layers include a resin such as acrylic or epoxy resin, a resin having a siloxane bond, and an inorganic insulating material such as silicon oxide, silicon oxynitride, silicon nitride oxide, silicon nitride, or aluminum oxide.

The light-emitting element is preferably provided between a pair of insulating films with low water permeability, in which case entry of impurities such as water into the light-emitting element can be inhibited. Thus, a decrease in device reliability can be suppressed.

<Liquid Crystal Element>

The liquid crystal element can employ, for example, a vertical alignment (VA) mode. Examples of the vertical alignment mode include a multi-domain vertical alignment (MVA) mode, a patterned vertical alignment (PVA) mode, and an advanced super view (ASV) mode.

The liquid crystal element can employ a variety of modes; for example, other than the VA mode, a twisted nematic (TN) mode, an in-plane switching (IPS) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, an electrically controlled birefringence (ECB) mode, or a guest-host mode can be used.

The liquid crystal element controls the transmission or non-transmission of light utilizing an optical modulation action of a liquid crystal. Note that the optical modulation action of the liquid crystal is controlled by an electric field applied to the liquid crystal (including a horizontal electric field, a vertical electric field, or an oblique electric field). As the liquid crystal used for the liquid crystal element, a thermotropic liquid crystal, a low-molecular liquid crystal, a high-molecular liquid crystal, a polymer dispersed liquid crystal (PDLC), a polymer network liquid crystal (PNLC), a ferroelectric liquid crystal, an anti-ferroelectric liquid crystal, or the like can be used. These liquid crystal materials exhibit a cholesteric phase, a smectic phase, a cubic phase, a chiral nematic phase, an isotropic phase, or the like depending on conditions.

As the liquid crystal material, either a positive liquid crystal or a negative liquid crystal may be used, and an appropriate liquid crystal material can be used depending on the mode or design to be used.

An alignment film can be provided to adjust the alignment of a liquid crystal. In the case where a horizontal electric field mode is employed, a liquid crystal exhibiting a blue phase for which an alignment film is unnecessary may be used. The blue phase is a liquid crystal phase, which is generated just before a cholesteric phase changes into an isotropic phase when the temperature of a cholesteric liquid crystal is increased. Since the blue phase appears only in a narrow temperature range, a liquid crystal composition in which a chiral material is mixed to account for several weight percent or more is used for the liquid crystal layer in order to improve the temperature range. The liquid crystal composition containing a liquid crystal exhibiting a blue phase and a chiral material has a short response time and optical isotropy, which eliminates the need for an alignment process and reduces the viewing angle dependence. Since the alignment film does not need to be provided, rubbing treatment is not necessary; accordingly, electrostatic discharge damage caused by the rubbing treatment can be prevented, reducing defects and damage of a liquid crystal display device in the manufacturing process.

Examples of the liquid crystal element include a transmissive liquid crystal element, a reflective liquid crystal element, and a semi-transmissive liquid crystal element.

In one embodiment of the present invention, a transmissive liquid crystal element is particularly suitable.

In the case where a transmissive or semi-transmissive liquid crystal element is used, two polarizing plates are provided such that a pair of substrates is sandwiched therebetween. Furthermore, a backlight is provided on the outer side of the polarizing plate. The backlight may be a direct-below backlight or an edge-light backlight. The direct-below backlight including a light-emitting diode (LED) is preferably used because local dimming is easily performed to improve contrast. The edge-light type backlight is preferably used because the thickness of a module including the backlight can be reduced.

When the edge-light type backlight is turned off, one embodiment of the present invention can be used as a see-through display.

<Coloring Layer>

Examples of a material that can be used for the coloring layers include a metal material, a resin material, and a resin material containing a pigment or dye.

<Light-Blocking Layer>

Examples of a material that can be used for the light-blocking layer include carbon black, titanium black, a metal, a metal oxide, and a composite oxide containing a solid solution of a plurality of metal oxides. The light-blocking layer may be a film containing a resin material or a thin film of an inorganic material such as a metal. Stacked films containing the material of the coloring layer can also be used for the light-blocking layer. For example, a stacked-layer structure of a film containing a material of a coloring layer which transmits light of a certain color and a film containing a material of a coloring layer which transmits light of another color can be employed. It is preferable that the coloring layer and the light-blocking layer be formed using the same material because the same manufacturing apparatus can be used and the process can be simplified.

The above is the descriptions of the components.

At least part of this embodiment can be implemented in combination with any of the other embodiments described in this specification as appropriate.

Embodiment 2

In this embodiment, structure examples of an input device (touch sensor) applicable to the display device of one embodiment of the present invention, an input/output device (touch panel) that is an example of the display device of one embodiment of the present invention, and the like will be described.

Structure Example of Touch Sensor

A structure example of the input device (touch sensor) will be described below with reference to drawings.

Figure 17A:
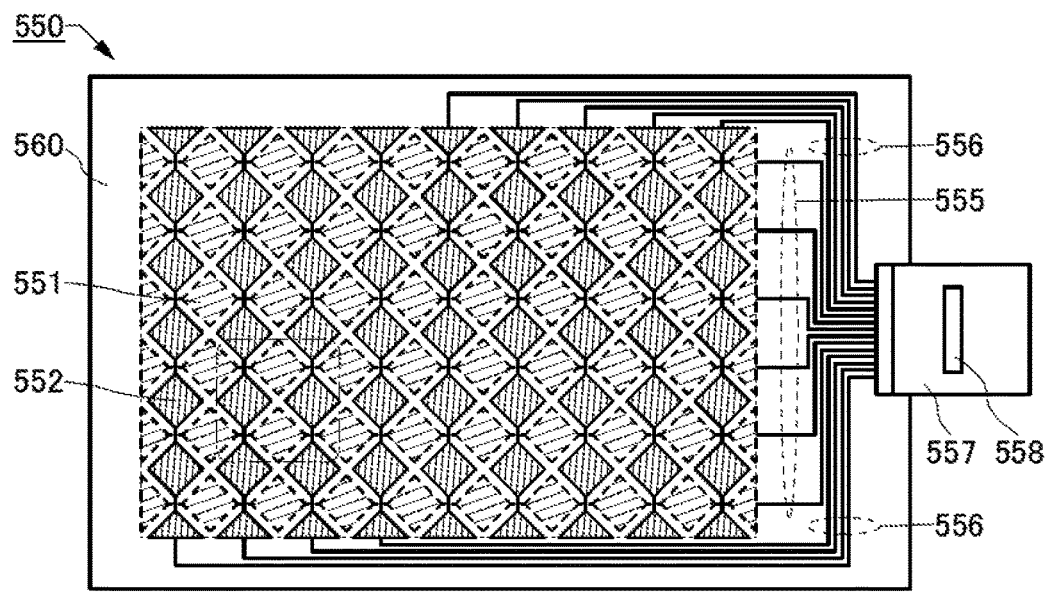
FIGS. 17A to 17D each illustrate a structure example of an input device.

FIG. 17A is a schematic top view of an input device 550. The input device 550 includes a plurality of conductive layers 551, a plurality of conductive layers 552, a plurality of wirings 555, and a plurality of wirings 556 over a substrate 560. The substrate 560 is provided with an FPC 557 which is electrically connected to each of the conductive layers 551 and the conductive layers 552. FIG. 17A illustrates an example in which the FPC 557 is provided with an IC 558.

Figure 17B:
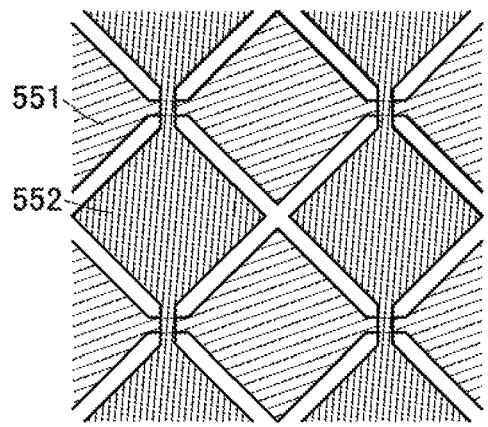

FIG. 17B is an enlarged view of a region surrounded by a dashed dotted line in FIG. 17A. The conductive layers 551 are each in the form of a row of rhombic electrode patterns arranged in a lateral direction. The rhombic electrode patterns aligned in a line are electrically connected to each other. The conductive layers 552 are also each in the form of a row of rhombic electrode patterns arranged in a longitudinal direction, and the rhombic electrode patterns aligned in a line are electrically connected to each other. Part of the conductive layer 551 and part of the conductive layer 552 overlap and intersect with each other. At this intersection portion, an insulator is sandwiched in order to avoid an electrical short-circuit between the conductive layers 551 and 552.

Figure 17C:
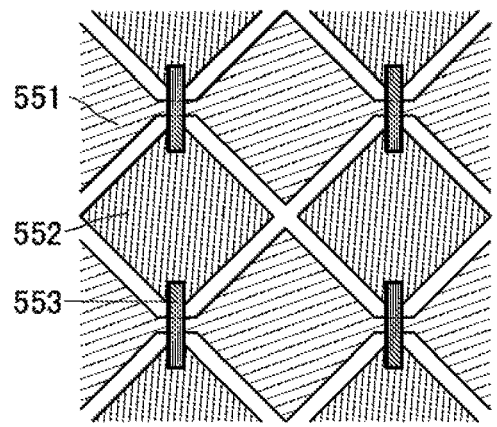

As illustrated in FIG. 17C, the rhombic conductive layers 552 may be connected with conductive layers 553. The island-shaped conductive layers 552 are arranged in the longitudinal direction, and two adjacent conductive layers 552 are electrically connected to each other by one of the conductive layers 553. Such a structure allows the conductive layers 551 and 552 to be formed at the same time by processing the same conductive film. This can prevent variations in the thickness of these conductive layers, and can prevent the resistance value and the light transmittance of each conductive layer from varying from place to place. Note that instead of the conductive layers 552, the conductive layers 551 may include the conductive layers 553.

Figure 17D:
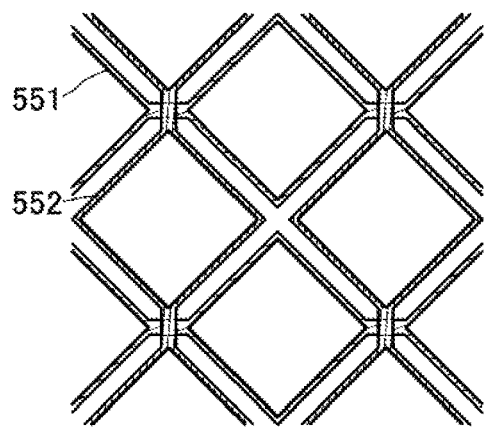

As illustrated in FIG. 17D, a design in which rhombic electrode patterns of the conductive layers 551 and 552 illustrated in FIG. 17B are hollowed out and only edge portions are left may be used. In that case, when the conductive layers 551 and 552 are narrow enough to be invisible to the users, the conductive layers 551 and 552 can be formed using a light-blocking material such as a metal or an alloy, as will be described later. In addition, either the conductive layers 551 or the conductive layers 552 illustrated in FIG. 17D may include the above conductive layers 553.

One of the conductive layers 551 is electrically connected to one of the wirings 555. One of the conductive layers 552 is electrically connected to one of the wirings 556. Here, either one of the conductive layers 551 and 552 corresponds to a row wiring, and the other corresponds to a column wiring.

The IC 558 has a function of driving the touch sensor. A signal output from the IC 558 is supplied to either of the conductive layers 551 and 552 through the wirings 555 or 556. A current (or a potential) flowing to either of the conductive layers 551 and 552 is input to the IC 558 through the wirings 555 or 556.

When a touch panel is formed in such a manner that the input device 550 is stacked over a display screen of the display panel, a light-transmitting conductive material is preferably used for the conductive layers 551 and 552. In the case where a light-transmitting conductive material is used for the conductive layers 551 and 552 and light from the display panel is extracted through the conductive layers 551 or 552, it is preferable that a conductive film containing the same conductive material be arranged between the conductive layers 551 and 552 as a dummy pattern. When part of a space between the conductive layers 551 and 552 is thus filled with the dummy pattern, variation in light transmittance can be reduced. As a result, unevenness in luminance of light transmitted through the input device 550 can be reduced.

As the light-transmitting conductive material, a conductive oxide such as indium oxide, indium tin oxide, indium zinc oxide, zinc oxide, or zinc oxide to which gallium is added can be used. Note that a film containing graphene may be used as well. The film containing graphene can be formed by, for example, reducing a film containing graphene oxide. As a reducing method, a method with application of heat or the like can be employed.

Alternatively, a metal film or an alloy film which is thin enough to have a light-transmitting property can be used. For example, a metal such as gold, silver, platinum, magnesium, nickel, tungsten, chromium, molybdenum, iron, cobalt, copper, palladium, or titanium, or an alloy containing any of these metals can be used. Alternatively, a nitride of the metal or the alloy (e.g., titanium nitride), or the like may be used. Alternatively, a stacked film in which two or more of conductive films containing the above materials are stacked may be used.

For the conductive layers 551 and 552, a conductive film that is processed to be thin enough to be invisible to the users may be used. Such a conductive film is processed into a lattice shape (a mesh shape), for example, which makes it possible to achieve both high conductivity and high visibility of the display device. It is preferable that the conductive film have a portion in which the width is greater than or equal to 30 nm and less than or equal to 100 μm, preferably greater than or equal to 50 nm and less than or equal to 50 μm, and further preferably greater than or equal to 50 nm and less than or equal to 20 μm. In particular, the conductive film preferably has a pattern width of 10 μm or less because it is hardly visible to the users.

Figure 18A:
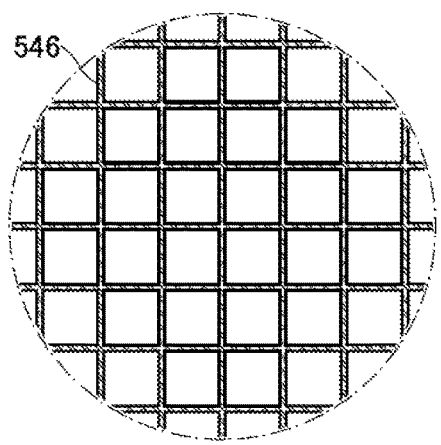
FIGS. 18A to 18D each illustrate a structure example of an input device.

As examples, enlarged schematic views of part of the conductive layers 551 or 552 are illustrated in FIGS. 18A to 18D. FIG. 18A illustrates an example where a lattice-shape conductive film 546 is used. The conductive film 546 is preferably placed so as not to overlap with the display element included in the display device because light from the display device is not blocked. In that case, it is preferable that the direction of the lattice be the same as the direction of the display element arrangement and that the pitch of the lattice be an integer multiple of the pitch of the display element arrangement.

Figure 18B:
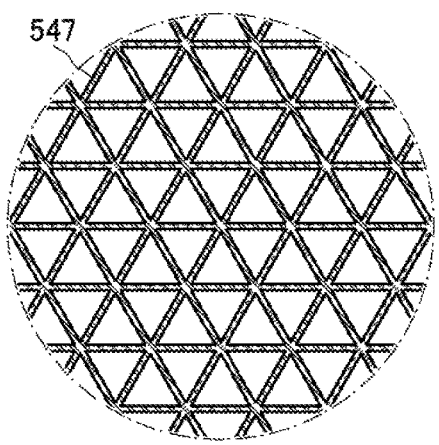

FIG. 18B illustrates an example of a lattice-shape conductive film 547, which is processed so as to be provided with triangle openings. Such a structure makes it possible to further reduce the resistance compared with the case illustrated in FIG. 18A.

Figure 18C:
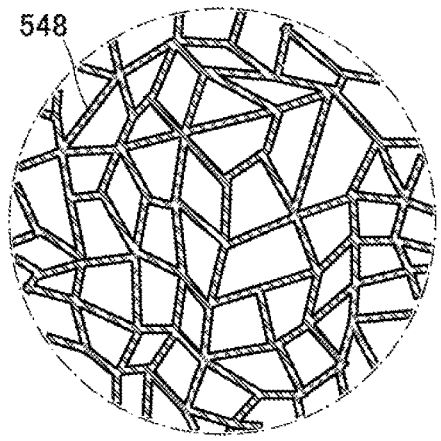

In addition, a conductive film 548, which has an irregular pattern shape, may be used as illustrated in FIG. 18C. Such a structure can prevent generation of moire when overlapping with the display portion of the display device.

Figure 18D:
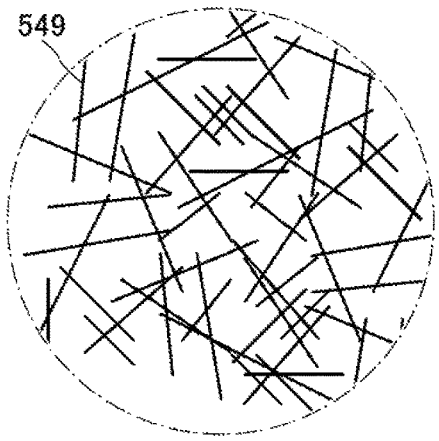

Conductive nanowires may be used for the conductive layers 551 and 552. FIG. 18D illustrates an example where nanowires 549 are used. The nanowires 549 are dispersed at appropriate density so as to be in contact with the adjacent nanowires, which can form a two-dimensional network; therefore, the nanowires 549 can function as a conductive film with extremely high light-transmitting property. For example, nanowires which have a mean diameter greater than or equal to 1 nm and less than or equal to 100 nm, preferably greater than or equal to 5 nm and less than or equal to 50 nm, and further preferably greater than or equal to 5 nm and less than or equal to 25 nm, can be used. As the nanowires 549, metal nanowires such as Ag nanowires, Cu nanowires, or Al nanowires, carbon nanotubes, or the like can be used. In the case of using Ag nanowires, a light transmittance of 89% or more and a sheet resistance of 40 ohms per square or more and 100 ohms per square or less can be achieved.

The above is the description of structure examples of a touch sensor.

Structure Example of Touch Panel

There is no limitation on the sensing element (also referred to as a sensor element) included in the touch panel of one embodiment of the present invention. A variety of sensors capable of sensing an approach or a contact of an object such as a finger or a stylus can be used as the sensor element.

For example, a variety of types such as a capacitive type, a resistive type, a surface acoustic wave type, an infrared type, an optical type, and a pressure-sensitive type can be used for the sensor.

In this embodiment, a touch panel including a capacitive sensor element is described as an example.

Examples of the capacitive touch sensor element include a surface capacitive touch sensor element and a projected capacitive touch sensor element. Examples of the projected capacitive sensor element include a self-capacitive sensor element and a mutual capacitive sensor element. The use of a mutual capacitive sensor element is preferable because multiple points can be sensed simultaneously.

The touch panel of one embodiment of the present invention can have any of a variety of structures, including a structure in which a display device and a sensor element that are separately formed are attached to each other and a structure in which an electrode and the like included in a sensor element are provided on one or both of a substrate supporting a display element and a counter substrate.

Structure Example

Figure 19A:
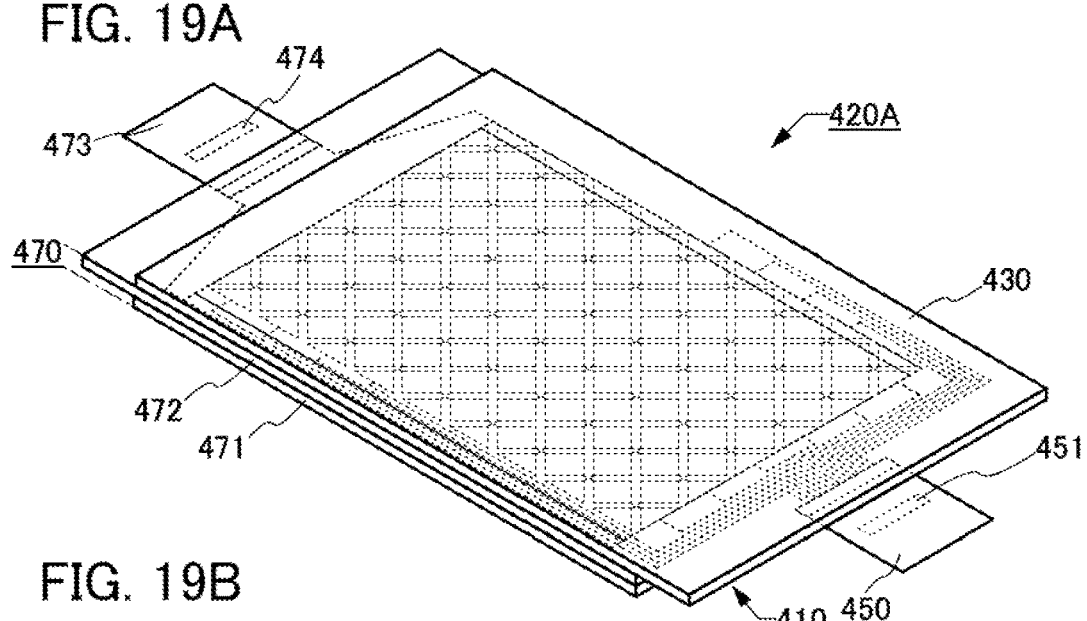
FIGS. 19A and 19B illustrate a structure example of a touch panel.
Figure 19B:
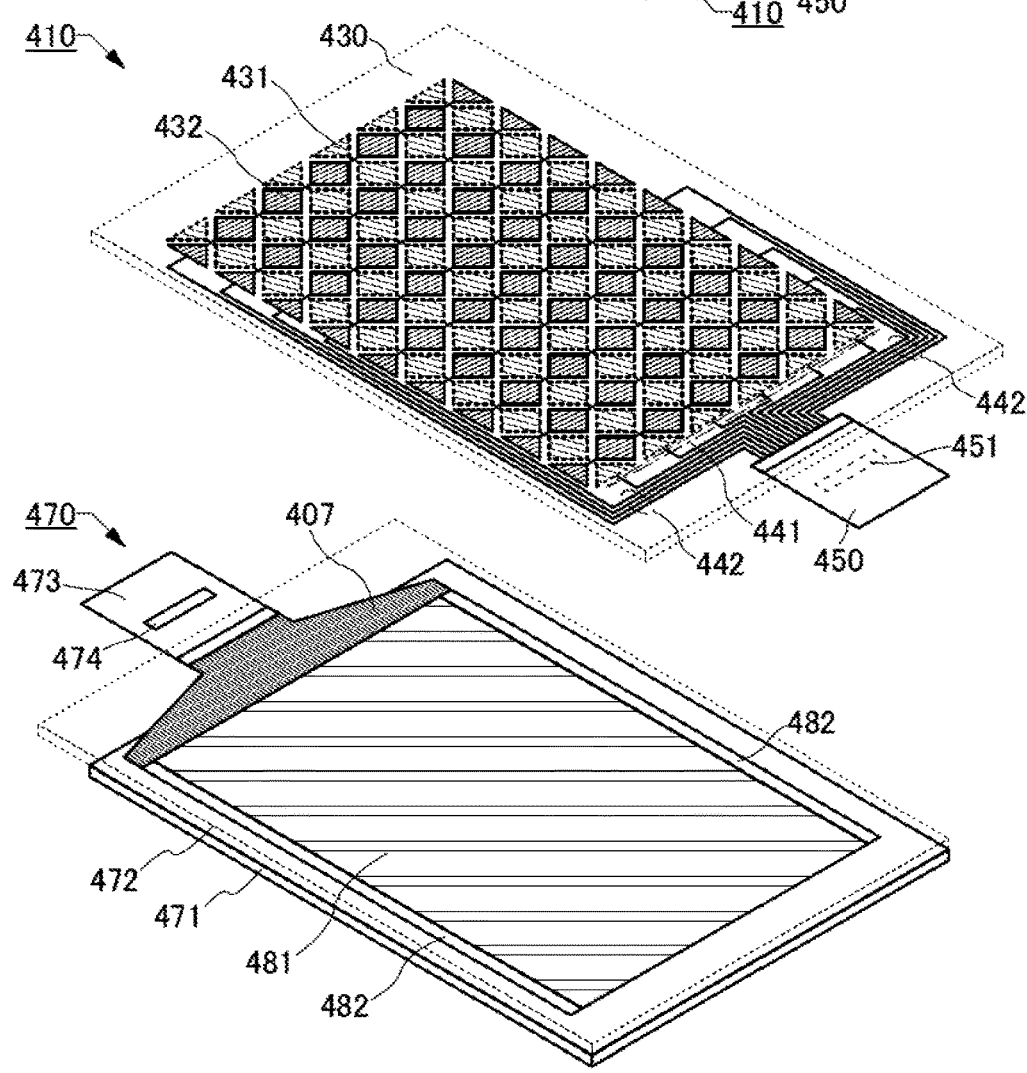

FIG. 19A is a schematic perspective view of a touch panel 420A. FIG. 19B is a developed view of the schematic perspective view of FIG. 19A. Note that only typical components are illustrated for simplicity. In FIG. 19B, the outlines of some components (e.g., a substrate 430 and a substrate 472) are illustrated only in dashed lines.

The touch panel 420A includes an input device 410 and a display device 470, which are provided to overlap with each other. Thus, the touch panel 420A can be referred to as an out-cell touch panel.

The display device described in Embodiment 1 can be used as the display device 470. Thus, the touch panel 420A has an extremely high aperture ratio and low power consumption.

The input device 410 includes the substrate 430, an electrode 431, an electrode 432, a plurality of wirings a wiring 441, and a plurality of wirings a wiring 442. An FPC 450 is electrically connected to each of the wirings 441 and 442. An IC 451 is provided on the FPC 450.

The display device 470 includes a substrate 471 and the substrate 472 which are provided to face each other. The display device 470 includes a display portion 481 and a driver circuit portion 482. A wiring 407 and the like are provided over the substrate 471. An FPC 473 is electrically connected to the wiring 407. An IC 474 is provided on the FPC 473.

The touch panel 420 illustrated in FIG. 19A an also be referred to as a touch panel module because the FPC 473, the IC 474, the FPC 450, the IC 451, and the like are mounted.

At least part of this embodiment can be implemented in combination with any of the other embodiments described in this specification as appropriate.

Embodiment 3

It is preferable that a pixel circuit for driving a liquid crystal element include a transistor using an oxide semiconductor and thus having an extremely low off-state current. Alternatively, a memory element may be applied to the pixel circuit. This allows the gray level to be maintained even when writing operation to a pixel is stopped while a still image is displayed using the liquid crystal element. That is, a display can be maintained even when the frame rate is set to an extremely small value. Thus, an image can be displayed with extremely low power consumption.

Hereinafter, operation modes which can be employed in the liquid crystal element will be described with reference to FIGS. 20A to 20C.

A normal driving mode (normal mode) with a normal frame frequency (typified by higher than or equal to 30 Hz and lower than or equal to 240 Hz, or higher than or equal to 60 Hz and lower than or equal to 240 Hz) and an idling stop (IDS) driving mode with a low frame frequency will be described below, for example.

Note that the idling stop (IDS) driving mode refers to a driving method in which after image data is written, rewriting of image data is stopped. This increases the interval between writing of image data and subsequent writing of image data, thereby reducing the power that would be consumed by writing of image data in that interval. The idling stop (IDS) driving mode can be performed at a frame frequency, which is about 1/100 to 1/10 of that of the normal driving mode, for example.

Figure 20A:
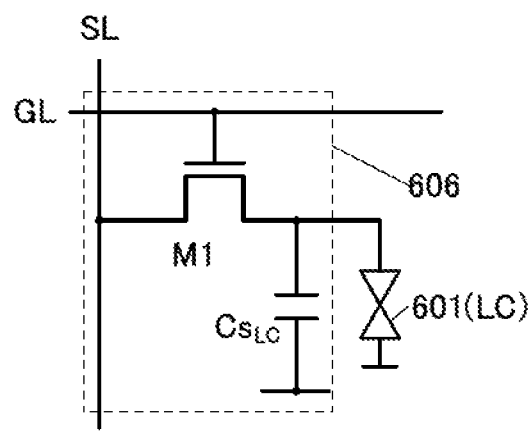
FIGS. 20A to 20C are a circuit diagram and timing charts.
Figure 20B:
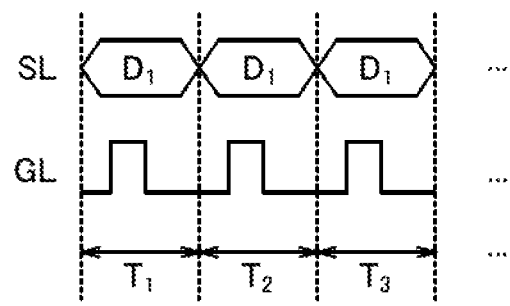
Figure 20C:
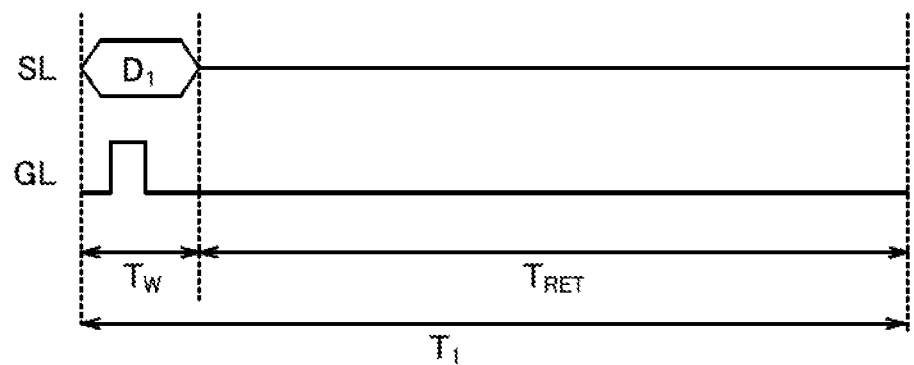

FIGS. 20A to 20C are a circuit diagram and timing charts illustrating the normal driving mode and the idling stop (IDS) driving mode. Note that in FIG. 20A, a liquid crystal element 601 (here, a transmissive liquid crystal element) and a pixel circuit 606 electrically connected to the liquid crystal element 601 are illustrated. FIG. 20A illustrates the pixel circuit 606 that includes a signal line SL, a gate line GL, a transistor M1 connected to the signal line SL and the gate line GL, and a capacitor $C_{SLC}$ connected to the transistor M1.

A transistor including a metal oxide in a semiconductor layer is preferably used as the transistor M1. In the case where the transistor including a metal oxide has at least one of an amplification function, a rectification function, and a switching function, the metal oxide can be referred to as a metal oxide semiconductor or an oxide semiconductor (abbreviated to an OS). As a typical example of the transistor, a transistor including an oxide semiconductor (OS transistor) is described. The OS transistor has an extremely low leakage current in a non-conduction state (off-state current); thus, a charge can be retained in the pixel electrode of the liquid crystal element when the OS transistor is turned off.

In the circuit diagram in FIG. 20A, the liquid crystal element LC is a leakage path of data $D_1$. Therefore, to perform idling stop driving appropriately, the resistivity of the liquid crystal element LC is preferably set higher than or equal to $1.0 \times 10^{14}$ Ω·cm.

Note that for example, an In—Ga—Zn oxide, an In—Zn oxide, or the like can be suitably used for a channel region of the above OS transistor. The In—Ga—Zn oxide can typically have an atomic ratio of In:Ga:Zn=1:1:1 or a neighborhood thereof, or an atomic ratio of In:Ga:Zn=4:2:3 or a neighborhood thereof.

FIG. 20B is a timing chart showing waveforms of signals supplied to the signal line SL and the gate line GL in the normal driving mode. In the normal driving mode, a normal frame frequency (e.g., 60 Hz) is used for operation. FIG. 20B shows a period $T_1$, a period $T_2$, and a period $T_3$. A scanning signal is supplied to the gate line GL in each frame period and the data $D_1$ is written from the signal line SL. This operation is also performed to write the same data $D_1$ in the periods $T_1$ to $T_3$ and to write different data in the periods $T_1$ to $T_3$.

FIG. 20C is a timing chart showing waveforms of signals supplied to the signal line SL and the gate line GL in the idling stop (IDS) driving mode. In the idling stop (IDS) driving mode, a low frame frequency (e.g., lower than or equal to 1 Hz) is used for operation. One frame period is shown as the period $T_1$, which includes a data writing period $T_W$ and a data retention period $T_{RET}$. In the idling stop (IDS) driving mode, a scanning signal is supplied to the gate line GL and the data $D_1$ of the signal line SL is written in the period $T_W$, and the gate line GL is fixed to a low-level voltage so that the transistor M1 is turned off and the written data $D_1$ is retained in the period $T_{RET}$. Note that a frame frequency of higher than or equal to 0.1 Hz and lower than 60 Hz, or higher than or equal to 0.1 Hz and lower than 30 Hz can be used as the low frame frequency, for example.

At least part of this embodiment can be implemented in appropriate combination with any of the other embodiments described in this specification.

Embodiment 4

In embodiment, a display module that can be fabricated using one embodiment of the present invention will be described.

Figure 21A:
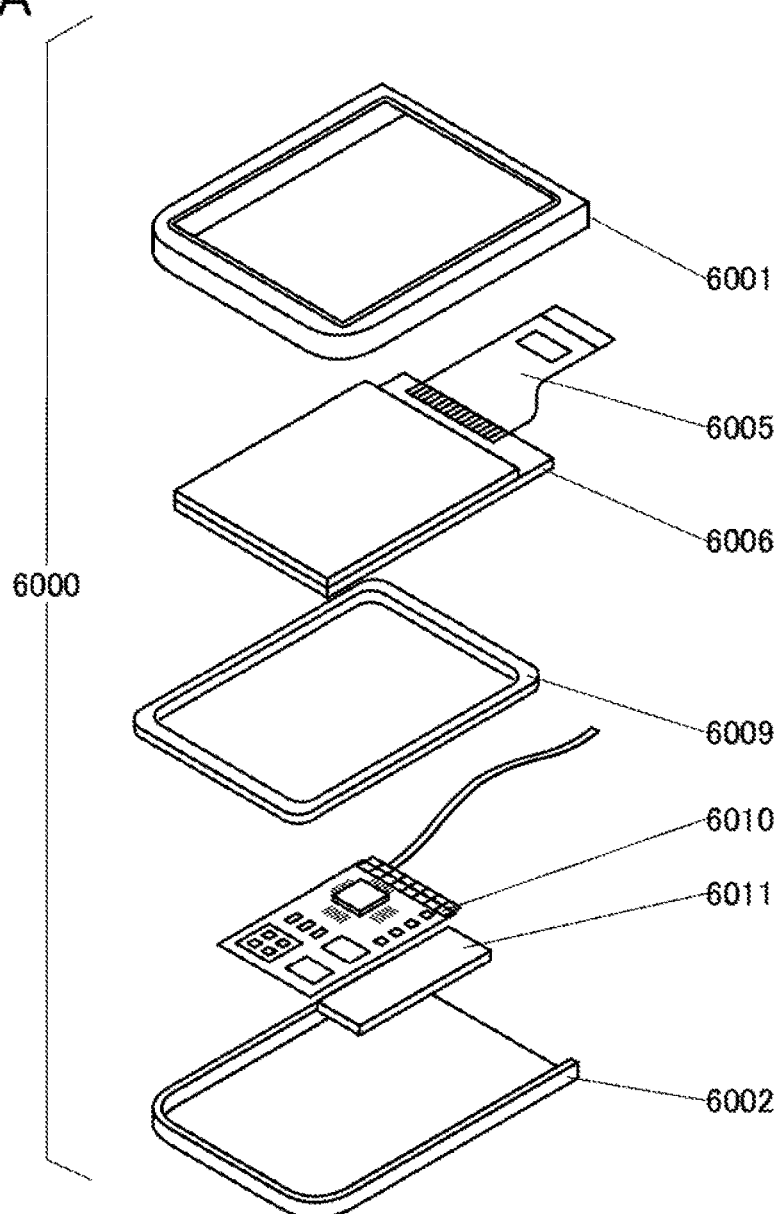
FIGS. 21A and 21B illustrate a structure example of a display module.

In a display module 6000 in FIG. 21A, a display panel 6006 connected to an FPC 6005, a frame 6009, a printed circuit board 6010, and a battery 6011 are provided between an upper cover 6001 and a lower cover 6002.

The display device of one embodiment of the present invention can be used for the display panel 6006, for example. The display panel 6006 can include a polarizing plate and a backlight. A display module with extremely low power consumption can be fabricated.

The shape and size of the upper cover 6001 and the lower cover 6002 can be changed as appropriate depending on the size of the display panel 6006.

A touch panel may be provided to overlap with the display panel 6006. The touch panel can be a resistive touch panel or a capacitive touch panel and can be formed to overlap with the display panel 6006. Instead of providing the touch panel, the display panel 6006 may have a touch panel function.

The frame 6009 protects the display panel 6006 and functions as an electromagnetic shield for blocking electromagnetic waves generated by the operation of the printed circuit board 6010. The frame 6009 can also function as a radiator plate.

The printed circuit board 6010 includes a power supply circuit and a signal processing circuit for outputting a video signal and a clock signal. As a power source for supplying power to the power supply circuit, an external commercial power source or the battery 6011 provided separately may be used. The battery 6011 can be omitted in the case of using a commercial power source.

Figure 21B:
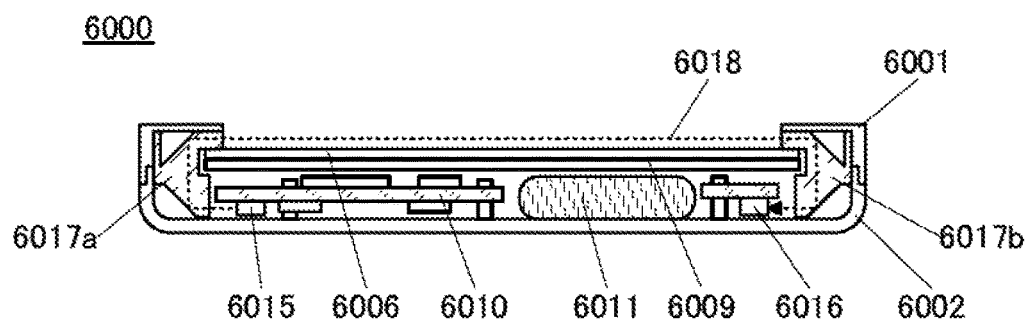

FIG. 21B is a schematic cross-sectional view of the display module 6000 with an optical touch sensor.

The display module 6000 includes a light-emitting portion 6015 and a light-receiving portion 6016 which are provided on the printed circuit board 6010. A pair of light guide portions (a light guide portion 6017a and a light guide portion 6017*b*) is provided in a region surrounded by the upper cover 6001 and the lower cover 6002.

For example, a plastic or the like can be used for the upper cover 6001 and the lower cover 6002. The upper cover 6001 and the lower cover 6002 can each be thin (e.g., greater than or equal to 0.5 mm and less than or equal to 5 mm). Therefore, the display module 6000 can be significantly lightweight. The upper cover 6001 and the lower cover 6002 can be manufactured with a small amount of material, and therefore, manufacturing costs can be reduced.

The display panel 6006 overlaps with the printed circuit board 6010 and the battery 6011 with the frame 6009 located therebetween. The display panel 6006 and the frame 6009 are fixed to the light guide portion 6017*a* and the light guide portion 6017*b*.

Light 6018 emitted from the light-emitting portion 6015 travels over the display panel 6006 through the light guide portion 6017*a* and reaches the light-receiving portion 6016 through the light guide portion 6017*b*. For example, blocking of the light 6018 by a sensing target such as a finger or a stylus can be sensed as touch operation.

A plurality of light-emitting portions 6015 are provided along two adjacent sides of the display panel 6006, for example. A plurality of light-receiving portions 6016 are provided so as to face the light-emitting portions 6015. Accordingly, information about the position of touch operation can be obtained.

As the light-emitting portion 6015, a light source such as an LED element can be used. It is particularly preferable to use a light source that emits infrared light, which is not visually recognized by users and is harmless to users, as the light-emitting portion 6015.

As the light-receiving portion 6016, a photoelectric element that receives light emitted from the light-emitting portion 6015 and converts it into an electrical signal can be used. A photodiode that can receive infrared light can be favorably used.

For the light guide portions 6017*a* and 6017*b*, members that transmit at least the light 6018 can be used. With the use of the light guide portions 6017*a* and 6017*b*, the light-emitting portion 6015 and the light-receiving portion 6016 can be placed under the display panel 6006, and a malfunction of the touch sensor due to external light reaching the light-receiving portion 6016 can be suppressed. It is particularly preferable to use a resin which absorbs visible light and transmits infrared light. This is more effective in suppressing the malfunction of the touch sensor.

At least part of this embodiment can be implemented in combination with any of the other embodiments described in this specification as appropriate.

Embodiment 5

In this embodiment, electronic devices to which the display device of one embodiment of the present invention can be applied will be described.

The display device of one embodiment of the present invention can display a bright image and achieve high visibility regardless of the intensity of external light. The display device of one embodiment of the present invention can also achieve low power consumption. For this reason, the display device can be suitably used for portable electronic devices, wearable electronic devices (wearable devices), e-book readers, television devices, digital signage, and the like.

Figure 22A:
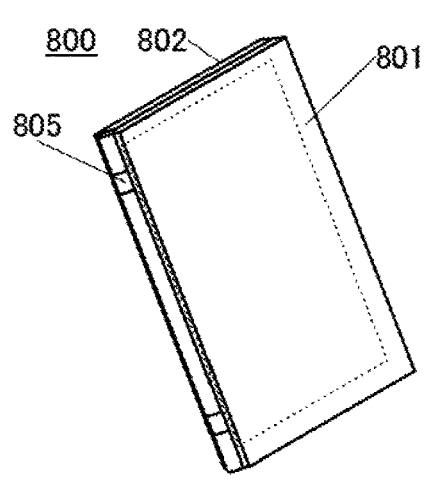
FIGS. 22A to 22D illustrate structure examples of electronic devices.
Figure 22B:
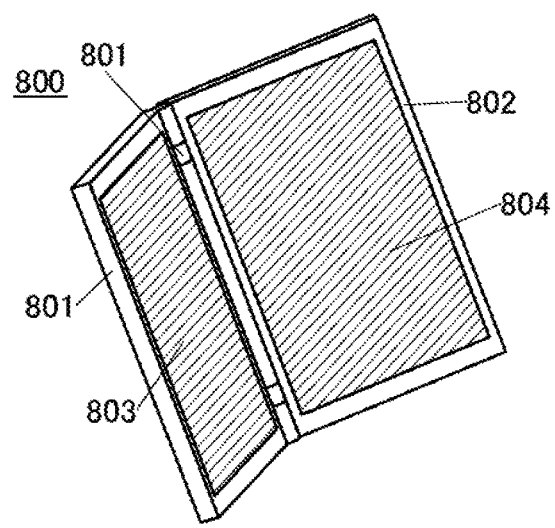

FIGS. 22A and 22B illustrate an example of a portable information terminal 800. The portable information terminal 800 includes a housing 801, a housing 802, a display portion 803, a display portion 804, and a hinge portion 805, for example.

The housing 801 and the housing 802 are connected with the hinge portion 805. The portable information terminal 800 folded as in FIG. 22A can be changed into the state illustrated in FIG. 22B, in which the housing 801 and the housing 802 are opened.

For example, the portable information terminal 800 can also be used as an e-book reader, in which the display portion 803 and the display portion 804 each can display text data. In addition, the display portion 803 and the display portion 804 each can display a still image or a moving image.

In this manner, the portable information terminal 800 has high versatility because it can be folded when carried.

Note that the housing 801 and the housing 802 may include a power switch, an operation button, an external connection port, a speaker, a microphone, and/or the like.

Figure 22C:
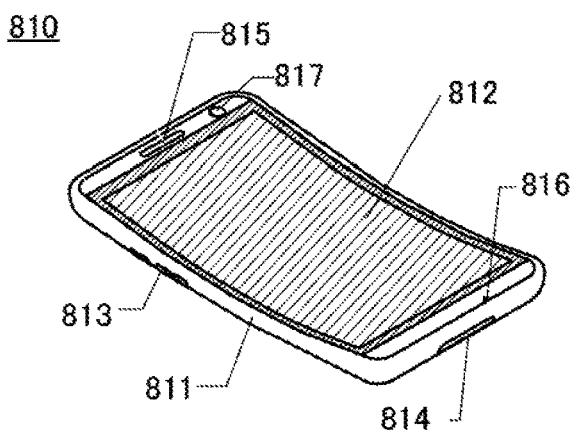

FIG. 22C illustrates an example of a portable information terminal. A portable information terminal 810 illustrated in FIG. 22C includes a housing 811, a display portion 812, operation buttons 813, an external connection port 814, a speaker 815, a microphone 816, a camera 817, and the like.

The display portion 812 is provided with the display device of one embodiment of the present invention.

The portable information terminal 810 includes a touch sensor in the display portion 812. Operations such as making a call and inputting a letter can be performed by touch on the display portion 812 with a finger, a stylus, or the like.

With the operation buttons 813, power on/off can be switched and types of images displayed on the display portion 812 can be switched. For example, images can be switched from a mail creation screen to a main menu screen.

When a detection device such as a gyroscope sensor or an acceleration sensor is provided inside the portable information terminal 810, the direction of display on the screen of the display portion 812 can be automatically changed by determining the orientation of the portable information terminal 810 (whether the portable information terminal 810 is placed horizontally or vertically). The direction of display on the screen can also be changed by touch on the display portion 812, operation with the operation buttons 813, sound input using the microphone 816, or the like.

The portable information terminal 810 has one or more of a telephone function, a notebook function, an information browsing function, and the like. Specifically, the portable information terminal 810 can be used as a smartphone. The portable information terminal 810 is capable of executing a variety of applications such as mobile phone calls, e-mailing, viewing and editing texts, music reproduction, video replay, Internet communication, and games.

Figure 22D:
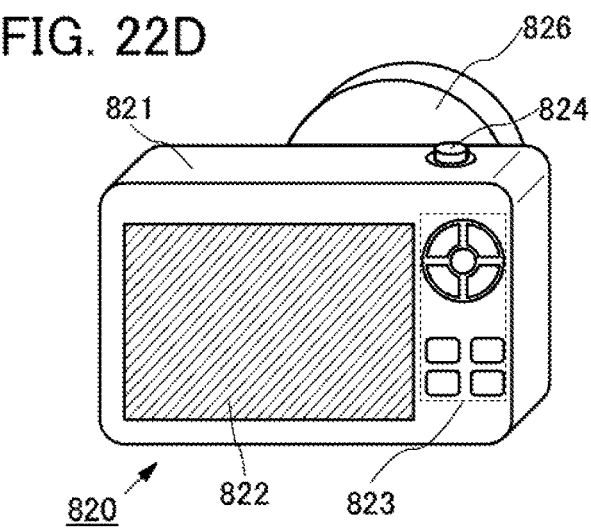

FIG. 22D illustrates an example of a camera. A camera 820 includes a housing 821, a display portion 822, operation buttons 823, a shutter button 824, and the like. The camera 820 is provided with an attachable lens 826.

The display portion 822 is provided with the display device of one embodiment of the present invention.

Although the lens 826 of the camera 820 here is detachable from the housing 821 for replacement, the lens 826 may be integrated with the housing 821.

Still images or moving images can be taken with the camera 820 by pushing the shutter button 824. In addition, images can be taken by a touch on the display portion 822 that serves as a touch panel.

Note that a stroboscope, a viewfinder, or the like can be additionally provided in the camera 820. Alternatively, these can be incorporated in the housing 821.

Figure 23A:
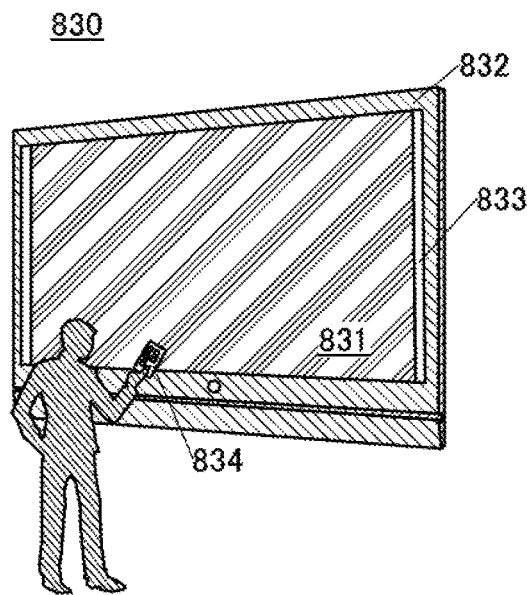
FIGS. 23A to 23C illustrate structure examples of electronic devices.

FIG. 23A illustrates a television device 830. The television device 830 includes a display portion 831, a housing 832, a speaker 833, and the like. The television device 830 can further include an LED lamp, operation keys (including a power switch or an operation switch), a connection terminal, a variety of sensors, a microphone, and the like.

The television device 830 can be controlled with a remote controller 834.

The television device 830 can receive airwaves such as a ground wave and a wave transmitted from a satellite. The television device 830 can receive airwaves for analog broadcasting, digital broadcasting, and the like, and image-sound-only broadcasting, sound-only broadcasting, and the like. For example, the television device 830 can receive airwaves transmitted in a certain frequency band, such as a UHF band (about 300 MHz to 3 GHz) or a VHF band (30 MHz to 300 MHz). When a plurality of pieces of data received in a plurality of frequency bands is used, the transfer rate can be increased and more information can thus be obtained. Accordingly, the display portion 831 can display an image with a resolution higher than the full high definition, such as 4K2K, 8K4K, 16K8K, or more.

When a plurality of pieces of data received in a plurality of frequency bands are used in the television device 830, for example, the transfer rate can be high and more data can thus be obtained. Accordingly, the display portion 831 can display an image with a resolution higher than the full high definition, such as 4K2K, 8K4K, 16K8K, or more.

The television device 830 may have a structure in which an image to be displayed on the display portion 831 is generated using broadcasting data transmitted with technology for transmitting data through a computer network such as the Internet, a local area network (LAN), or Wi-Fi (registered trademark). In that case, the television device 830 does not necessarily include a tuner.

Figure 23B:
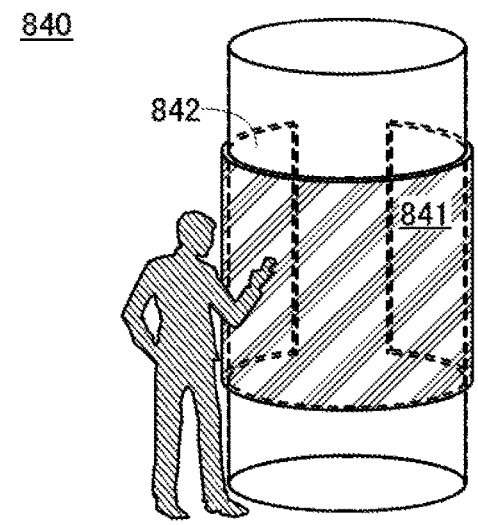

FIG. 23B illustrates a digital signage 840 mounted on a cylindrical pillar 842. The digital signage 840 includes a display portion 841.

The larger display portion 841 can provide more information at a time. In addition, a larger display portion 841 attracts more attention, so that the effectiveness of the advertisement is expected to be increased, for example.

It is preferable to use a touch panel in the display portion 841 because a device with such a structure does not only display a still or moving image, but can be operated by users intuitively. Alternatively, in the case where the display device of one embodiment of the present invention is used for providing information such as route information or traffic information, usability can be enhanced by intuitive operation.

Figure 23C:
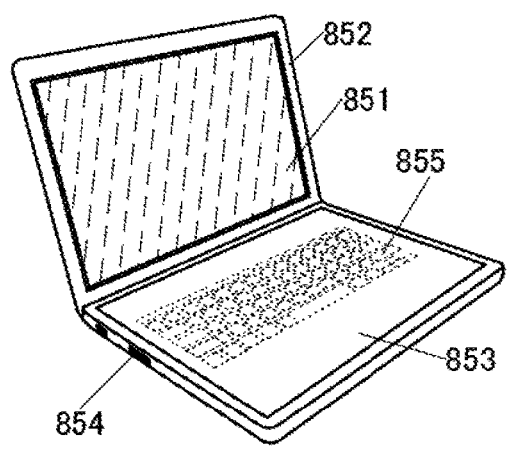

FIG. 23C illustrates a notebook personal computer 850. The personal computer 850 includes a display portion 851, a housing 852, a touch pad 853, a connection port 854, and the like.

The touch pad 853 functions as an input unit such as a pointing device or a pen tablet and can be controlled with a finger, a stylus, or the like.

Furthermore, a display element is incorporated in the touch pad 853. As illustrated in FIG. 23C, when an input key 855 is displayed on a surface of the touch pad 853, the touch pad 853 can be used as a keyboard. In that case, a vibration module may be incorporated in the touch pad 853 so that sense of touch is achieved by vibration when a user touches the input key 855.

At least part of this embodiment can be implemented in combination with any of the other embodiments described in this specification as appropriate.

This application is based on Japanese Patent Application Serial No. 2016-226669 filed with Japan Patent Office on Nov. 22, 2016, the entire contents of which are hereby incorporated by reference.

What is claimed is:

1. A display device comprising:
    a first coloring layer;
    a second coloring layer;
    a first transistor comprising a first semiconductor layer;
    a second transistor comprising a second semiconductor layer;
    a first display element electrically connected to the first transistor and overlapping with the first coloring layer; and
    a second display element electrically connected to the second transistor and overlapping with the second coloring layer,
    wherein the first semiconductor layer and the second semiconductor layer each comprise a region overlapping with the first coloring layer.

2. The display device according to claim 1, wherein the first coloring layer transmits longer wavelength light than the second coloring layer.

3. The display device according to claim 1, wherein the first coloring layer transmits red light.

4. The display device according to claim 1 further comprising a light source emitting white light,
    wherein the first coloring layer is between the light source and each of the first semiconductor layer and the second semiconductor layer.

5. The display device according to claim 1,
    wherein the first transistor comprises a first electrode and a second electrode each connected to the first semiconductor layer,
    wherein the second transistor comprises a third electrode and a fourth electrode each connected to the second semiconductor layer, and
    wherein each of the first electrode, the second electrode, the third electrode, and the fourth electrode comprises a region transmitting visible light and overlapping with the first coloring layer.

6. The display device according to claim 1,
    wherein the first transistor and the second transistor comprise a first gate electrode and a second gate electrode, respectively, and
    wherein each of the first gate electrode and the second gate electrode comprises a region transmitting visible light and overlapping with the first coloring layer.

7. The display device according to claim 1,
    wherein the first transistor and the second transistor comprise a first gate electrode and a second gate electrode, respectively, and
    wherein each of the first gate electrode and the second gate electrode blocks visible light.

8. The display device according to claim 1 further comprising:
    a first wiring; and
    a second wiring,
    wherein the first transistor comprises a first electrode and a second electrode each connected to the first semiconductor layer,
    wherein the second transistor comprises a third electrode and a fourth electrode each connected to the second semiconductor layer, wherein the first electrode is electrically connected to the first wiring, wherein the second electrode is electrically connected to the first display element, wherein the third electrode is electrically connected to the second wiring, and wherein the fourth electrode is electrically connected to the second display element and intersects with the second wiring.

9. The display device according to claim 1 further comprising:
a first wiring; and
a second wiring,
wherein the first transistor comprises a first electrode and a second electrode each connected to the first semiconductor layer,
wherein the second transistor comprises a third electrode and a fourth electrode each connected to the second semiconductor layer,
wherein the first electrode is electrically connected to the first wiring,
wherein the second electrode is electrically connected to the first display element,
wherein the third electrode is electrically connected to the second wiring, and
wherein the fourth electrode is electrically connected to the second display element and intersects with the first wiring and with the second wiring.

10. The display device according to claim 1 further comprising:
a first wiring; and
a second wiring,
wherein the first transistor and the second transistor comprise a first gate electrode and a second gate electrode, respectively,
wherein the first semiconductor layer comprises a region overlapping with the first gate electrode and a region connected to the first wiring, and
wherein the second semiconductor layer comprises a region overlapping with the second gate electrode, a region connected to the second wiring, and a region intersecting with the second wiring.

11. The display device according to claim 1 further comprising:
a first wiring; and
a second wiring,
wherein the first transistor and the second transistor comprise a first gate electrode and a second gate electrode, respectively,
wherein the first semiconductor layer comprises a region overlapping with the first gate electrode and a region connected to the first wiring, and
wherein the second semiconductor layer comprises a region overlapping with the second gate electrode, a region connected to the second wiring, and a region intersecting with the second wiring and with the first wiring.

12. The display device according to claim 1, wherein each of the first semiconductor layer and the second semiconductor layer comprises a metal oxide.

13. The display device according to claim 1,
wherein the first display element comprises a fifth electrode, a sixth electrode, and a liquid crystal,
wherein the fifth electrode is electrically connected to the first transistor, and
wherein each of the fifth electrode and the sixth electrode transmits visible light.

14. A display device comprising:
a first coloring layer;
a second coloring layer;
a third coloring layer;
a first transistor comprising a first semiconductor layer;
a second transistor comprising a second semiconductor layer;
a third transistor comprising a third semiconductor layer;
a first display element electrically connected to the first transistor and overlapping with the first coloring layer;
a second display element electrically connected to the second transistor and overlapping with the second coloring layer; and
a third display element electrically connected to the third transistor and overlapping with the third coloring layer,
wherein the first semiconductor layer, the second semiconductor layer, and the third semiconductor layer each comprise a region overlapping with the first coloring layer.

15. The display device according to claim 14, wherein the first coloring layer transmits longer wavelength light than the second coloring layer and the third coloring layer.

16. The display device according to claim 14, wherein the first coloring layer transmits red light.

17. The display device according to claim 14 further comprising a light source emitting white light,
wherein the first coloring layer is between the light source and each of the first semiconductor layer, the second semiconductor layer, and the third semiconductor layer.

18. The display device according to claim 14,
wherein the first transistor comprises a first electrode and a second electrode each connected to the first semiconductor layer,
wherein the second transistor comprises a third electrode and a fourth electrode each connected to the second semiconductor layer,
wherein the third transistor comprises a fifth electrode and a sixth electrode each connected to the third semiconductor layer, and
wherein each of the first electrode, the second electrode, the third electrode, the fourth electrode, the fifth electrode, and the sixth electrode comprises a region transmitting visible light and overlapping with the first coloring layer.

19. The display device according to claim 14,
wherein the first transistor, the second transistor, and the third transistor comprise a first gate electrode, a second gate electrode, and a third gate electrode, respectively, and
wherein each of the first gate electrode, the second gate electrode, and the third gate electrode comprises a region transmitting visible light and overlapping with the first coloring layer.

20. The display device according to claim 14,
wherein the first transistor, the second transistor, and the third transistor comprise a first gate electrode, a second gate electrode, and a third gate electrode, respectively, and
wherein each of the first gate electrode, the second gate electrode, and the third gate electrode blocks visible light.

21. The display device according to claim 14 further comprising:
a first wiring; and
a second wiring, wherein the first transistor comprises a first electrode and a second electrode each connected to the first semiconductor layer, wherein the second transistor comprises a third electrode and a fourth electrode each connected to the second semiconductor layer, wherein the first electrode is electrically connected to the first wiring, wherein the second electrode is electrically connected to the first display element, wherein the third electrode is electrically connected to the second wiring, and wherein the fourth electrode is electrically connected to the second display element and intersects with the second wiring.

22. The display device according to claim 14 further comprising:

a first wiring; and a second wiring, wherein the first transistor comprises a first electrode and a second electrode each connected to the first semiconductor layer, wherein the second transistor comprises a third electrode and a fourth electrode each connected to the second semiconductor layer, wherein the first electrode is electrically connected to the first wiring, wherein the second electrode is electrically connected to the first display element, wherein the third electrode is electrically connected to the second wiring, and wherein the fourth electrode is electrically connected to the second display element and intersects with the first wiring and with the second wiring.

23. The display device according to claim 14 further comprising:

a first wiring; and a second wiring, wherein the first transistor and the second transistor comprise a first gate electrode and a second gate electrode, respectively, wherein the first semiconductor layer comprises a region overlapping with the first gate electrode and a region connected to the first wiring, and wherein the second semiconductor layer comprises a region overlapping with the second gate electrode, a region connected to the second wiring, and a region intersecting with the second wiring.

24. The display device according to claim 14 further comprising:

a first wiring; and a second wiring, wherein the first transistor and the second transistor comprise a first gate electrode and a second gate electrode, respectively, wherein the first semiconductor layer comprises a region overlapping with the first gate electrode and a region connected to the first wiring, and wherein the second semiconductor layer comprises a region overlapping with the second gate electrode, a region connected to the second wiring, and a region intersecting with the second wiring and with the first wiring.

25. The display device according to claim 14, wherein each of the first semiconductor layer and the second semiconductor layer comprises a metal oxide.

26. The display device according to claim 14, wherein the first display element comprises a fifth electrode, a sixth electrode, and a liquid crystal, wherein the fifth electrode is electrically connected to the first transistor, and wherein each of the fifth electrode and the sixth electrode transmits visible light.

* * * * *